United States Patent
Roberts et al.

(10) Patent No.: US 11,629,519 B2
(45) Date of Patent: *Apr. 18, 2023

(54) BLAST, BALLISTIC AND FORCED ENTRY RESISTANT SHELTER

(71) Applicant: United States of America as Represented by The Secretary of The Army, Alexandria, VA (US)

(72) Inventors: Justin M. Roberts, Florence, MS (US); John M. Hoemann, Vicksburg, MS (US); Craig R Ackerman, Leesburg, VA (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 887 days.

This patent is subject to a terminal disclaimer.

(21) Appl. No.: 15/461,226

(22) Filed: Mar. 16, 2017

(65) Prior Publication Data

US 2018/0010352 A1    Jan. 11, 2018

Related U.S. Application Data

(63) Continuation-in-part of application No. 13/886,248, filed on May 2, 2013, now Pat. No. 11,267,516.
(Continued)

(51) Int. Cl.
*E04H 9/10*    (2006.01)
*B23P 6/00*    (2006.01)
(Continued)

(52) U.S. Cl.
CPC ............... *E04H 9/10* (2013.01); *B23P 6/00* (2013.01); *E04B 1/1912* (2013.01); *E04B 1/2403* (2013.01); *E04B 2/58* (2013.01); *E04B 5/10* (2013.01); *E04B 7/022* (2013.01); *E04C 3/06* (2013.01); *E04C 3/32* (2013.01); *E06B 1/02* (2013.01); *E06B 1/56* (2013.01); *F41H 5/24* (2013.01); *F41H 7/04* (2013.01); *E04B 2001/199* (2013.01);
(Continued)

(58) Field of Classification Search
CPC ...... B65D 88/121; B65D 90/12; B65D 90/20; F41H 5/24; E04H 9/10; E04H 2001/1283; E04B 5/10; E04B 7/022; E04B 2/58
See application file for complete search history.

(56) References Cited

U.S. PATENT DOCUMENTS 5,511,908 A * 4/1996 Van Valkenburgh ........................ B65F 1/1426
206/386
5,735,639 A    4/1998 Payne et al.
(Continued)

*Primary Examiner* — Don M Anderson
(74) *Attorney, Agent, or Firm* — Brian C. Jones

(57) ABSTRACT

The present anti-ballistic shelter is a reinforced unit configured to comply with both ISO standards for size and weight, and with the U.S. Department of State Certification Standard for Forced Entry and Ballistic Resistance of Structural Systems. Each end and side wall of the unit is reinforced with wall studs that penetrate the unit's structural framework. Even though these wall studs are welded into place, penetration of the wall studs into the framework ensures acceptable blast, ballistic, and forced entry resistance even if the welds are flawed.

15 Claims, 53 Drawing Sheets

Related U.S. Application Data

(60) Provisional application No. 61/641,877, filed on May 2, 2012.

(51) Int. Cl.
| | |
|---|---|
| *E04B 1/19* | (2006.01) |
| *E04B 1/24* | (2006.01) |
| *E04B 2/58* | (2006.01) |
| *E04B 5/10* | (2006.01) |
| *E04B 7/02* | (2006.01) |
| *E06B 1/02* | (2006.01) |
| *E06B 1/56* | (2006.01) |
| *E04C 3/06* | (2006.01) |
| *E04C 3/32* | (2006.01) |
| *F41H 7/04* | (2006.01) |
| *F41H 5/24* | (2006.01) |
| *E04C 3/04* | (2006.01) |
| *E04H 1/12* | (2006.01) |

(52) U.S. Cl.
CPC ............ *E04B 2001/1972* (2013.01); *E04B 2001/2427* (2013.01); *E04B 2001/2451* (2013.01); *E04B 2001/2463* (2013.01); *E04B 2001/2466* (2013.01); *E04B 2001/2481* (2013.01); *E04B 2001/2484* (2013.01); *E04B 2103/06* (2013.01); *E04C 2003/0465* (2013.01); *E04C 2003/0473* (2013.01); *E04H 2001/1283* (2013.01)

(56) References Cited

U.S. PATENT DOCUMENTS

| | | | | |
|---|---|---|---|---|
| 6,109,469 | A | 8/2000 | Clive-Smith | |
| 6,155,747 | A * | 12/2000 | Payne | B09B 3/00 405/129.55 |
| 6,179,522 | B1 | 1/2001 | Sanford et al. | |
| 6,299,008 | B1 | 10/2001 | Payne | |
| 7,565,773 | B1 | 7/2009 | Romig | |
| 7,827,738 | B2 * | 11/2010 | Abrams | E04B 1/003 52/79.1 |
| 8,286,391 | B2 * | 10/2012 | Yang | E04B 1/3444 52/64 |
| 8,429,857 | B2 * | 4/2013 | Melrose | F41H 5/013 52/169.6 |
| 9,316,015 | B1 * | 4/2016 | Elliott | E04B 1/24 |
| 2007/0271857 | A1 * | 11/2007 | Heather | B65D 88/005 52/79.9 |
| 2010/0162929 | A1 * | 7/2010 | Smit | E04B 1/3483 109/79 |

* cited by examiner

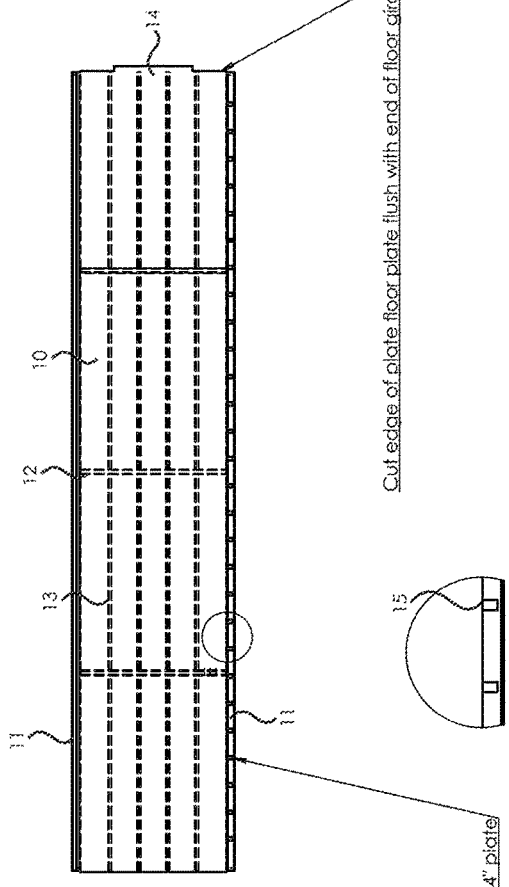
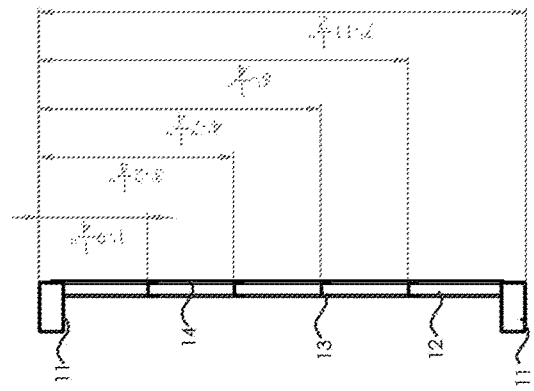
FIG. 2 description: Roof/Floor Support Beam
weight: 58.92 lbs.
stock size: MC3x7.1
material: A36

Dimensions are in feet and inches - Reference Standards AISC 303-05 and ISO 668:1995(E)

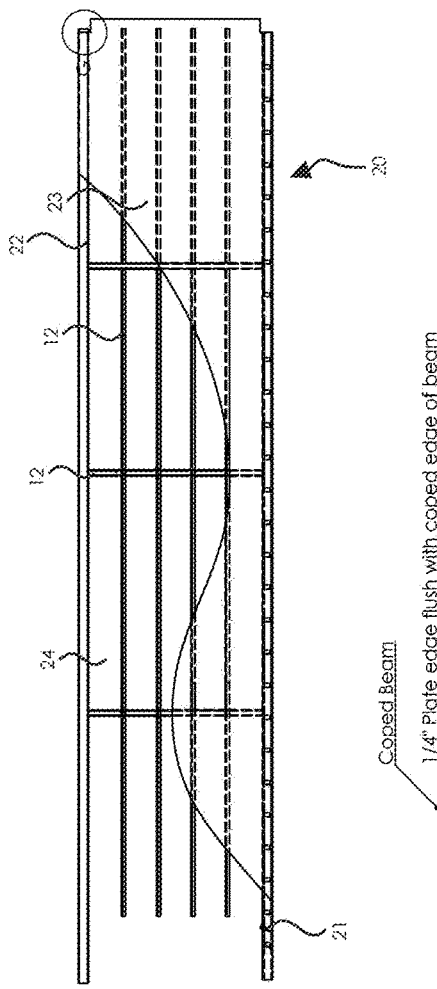

| ITEM NO. | PART NUMBER | DESCRIPTION | QTY. | Reference |
|---|---|---|---|---|
| 12 | FJ-0303516 | Floor/Roof Support Beam | 3 | B01-003 |
| 13 | FJ-MC3-7.1 | Floor/Roof Support Beam | 16 | B01-004 |
| 21 | FTG-050312 | Top Girder for walled section | 1 | B02-001 |
| 22 | FTG-090514 | Top Main Girder | 1 | B02-002 |
| 23 | PL-EXT-58R | A36 5/8" Roof | 1 | B02-003 |
| 24 | PL-INT-25R | Interior Roof | 1 | B02-004 | description: HATS40-W Top Assembly
weight: 13719.59 lbs.
stock size:
material:

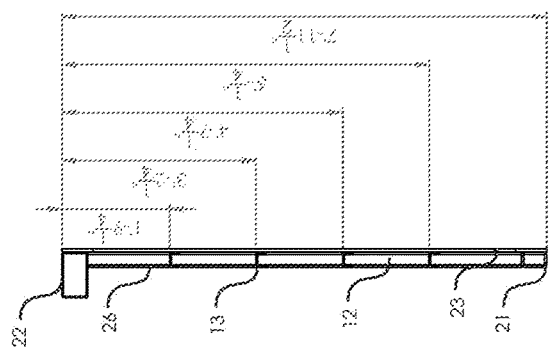

FIG. 9

Top Assembly has an interior ceiling plate (1/4") and an exterior roof plate (5/8).
The stud holes face the interior.
Dimensions are in feet and inches - Reference Standards AISC 303-05 and ISO 668:1995(E.)

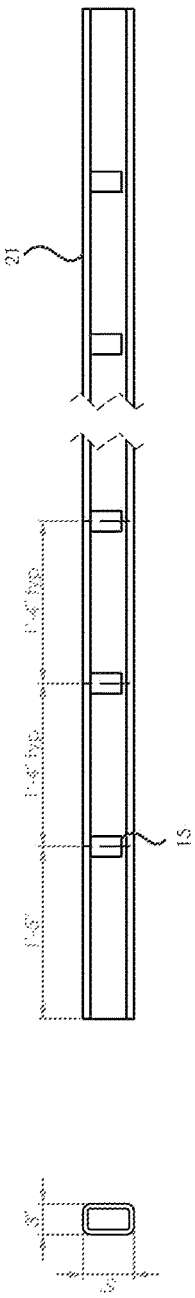

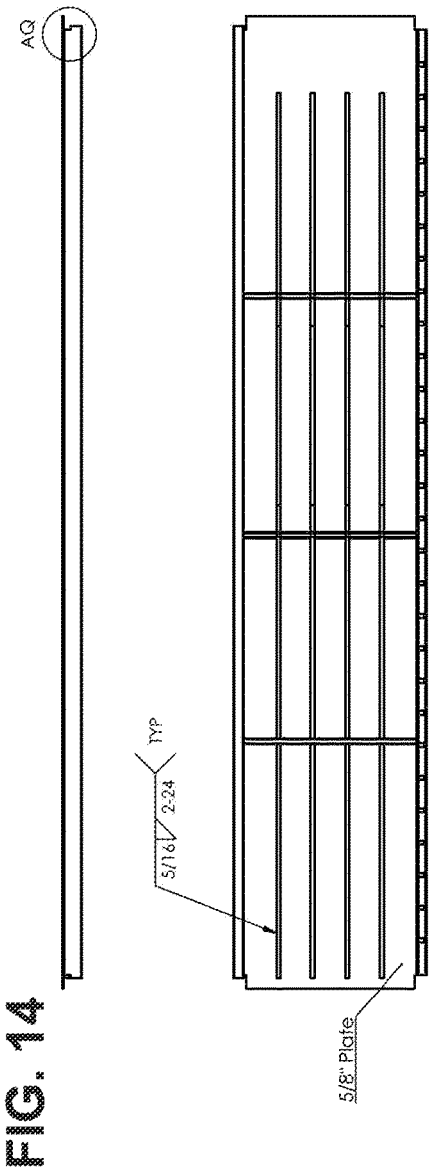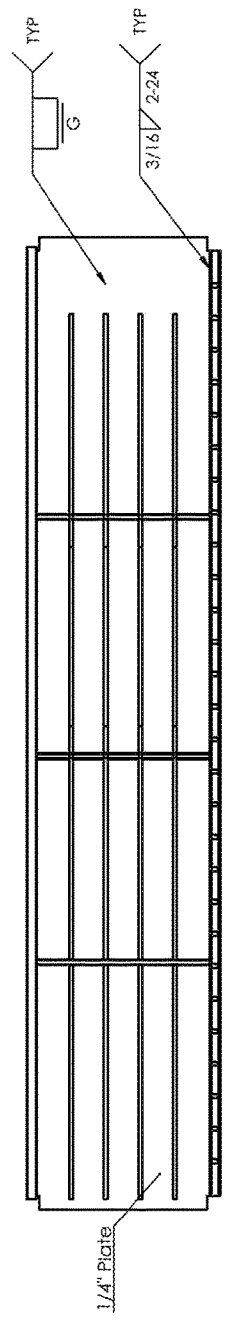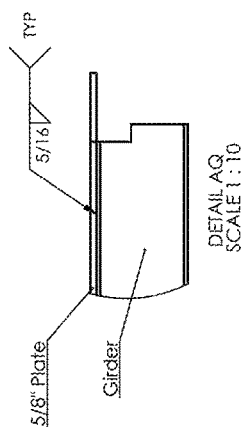
FIG. 14 description: Right ISO Corner Fitting
weight: 24.49 lbs.
stock size:
material: Low Carbon Steel Standard dimensions
Commercially available
Dimensions are in feet and inches - Reference Standards AISC 303-05 and ISO 668:1995(E)

description: Left ISO corner fitting
weight: 25.03 lbs.
stock size:
material: Low carbon steel Standard dimensions
Commercially available
Dimensions are in feet and inches - Reference Standards AISC 303-05 and ISO 668:1995(E)

FIG. 27
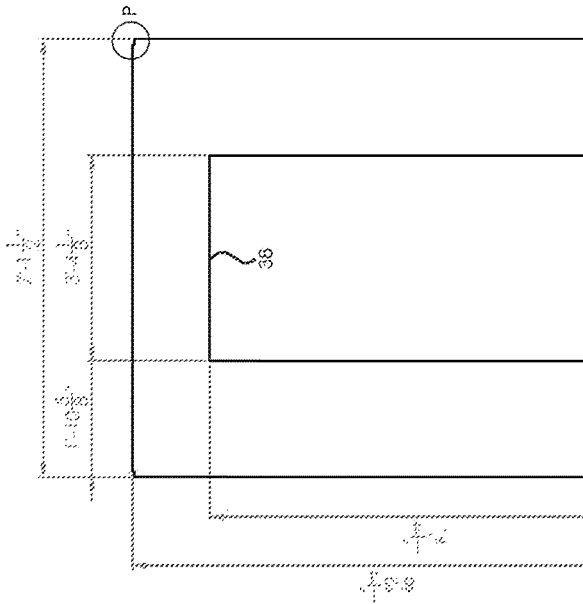
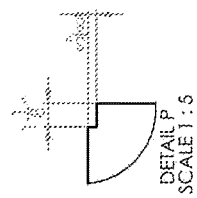

FIG. 28
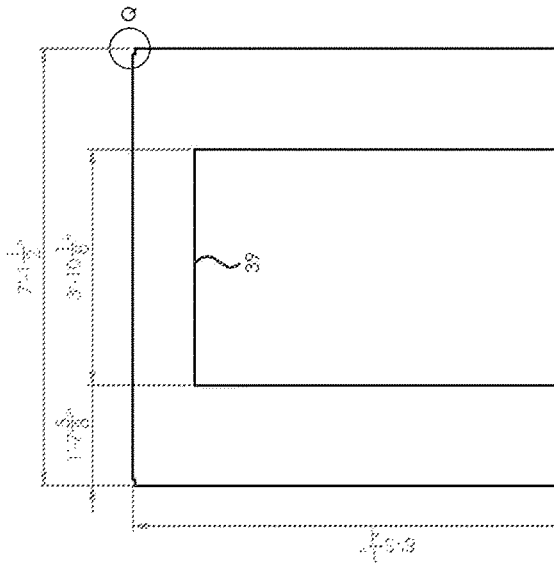
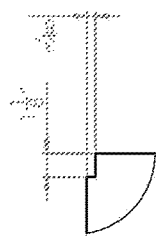
DETAIL Q
SCALE 1 : 5

FIG. 31
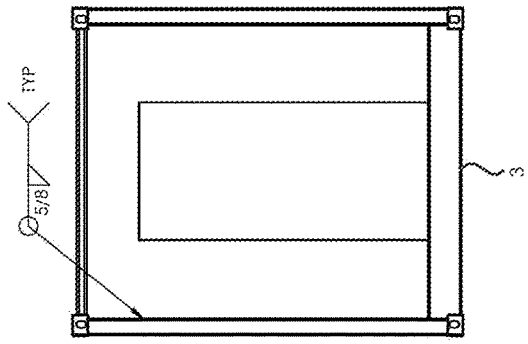
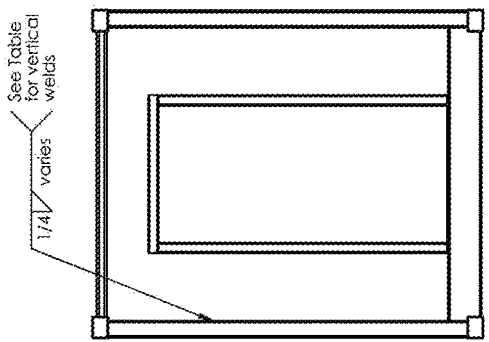
| Vertical Stitch Weld & Spacing | |
|---|---|
| Weld Length | Space |
| 17 1/8" | 1 5/8" |
| 3 | 2 1/2" |
| 3 | 4 1/2" |
| 3 | 6" |
| 3 | 17 1/2" |
| 3 | 6" |
| 3 | 4 1/2" |
| 3 | 2 1/2" |
| 3 | 1 5/8" |
Stitch weld pattern is defined in the table
Dimensions are in feet and inches - Reference Standards AISC 303-05 and ISO 668:1995(E)
description: HATS40-W end wall with 1 door Welds
weight: 5472.34 lbs
stock size:
material:

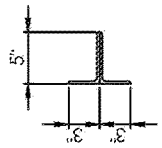
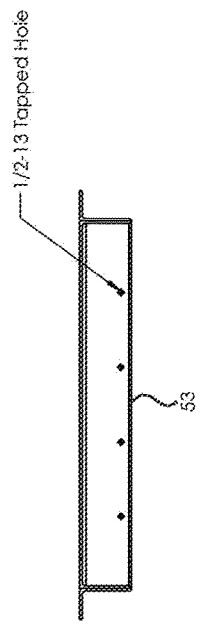
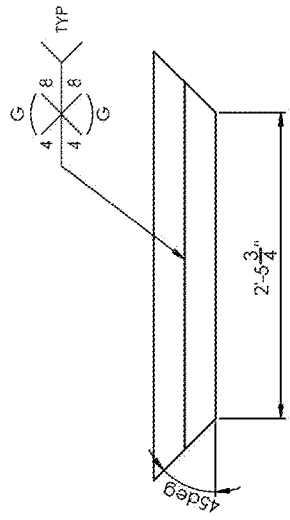
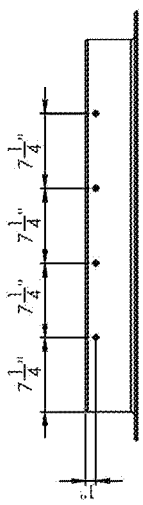
FIG. 38

FIG. 43
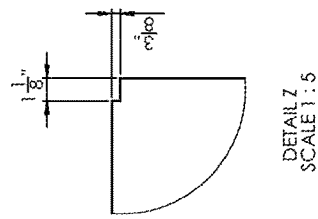
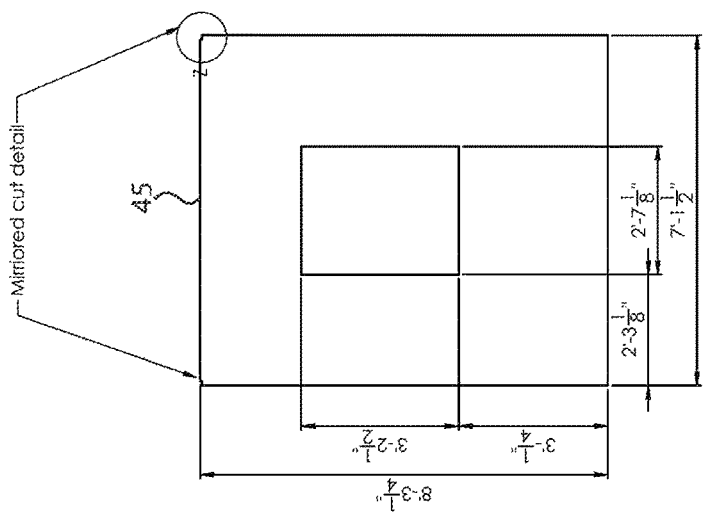

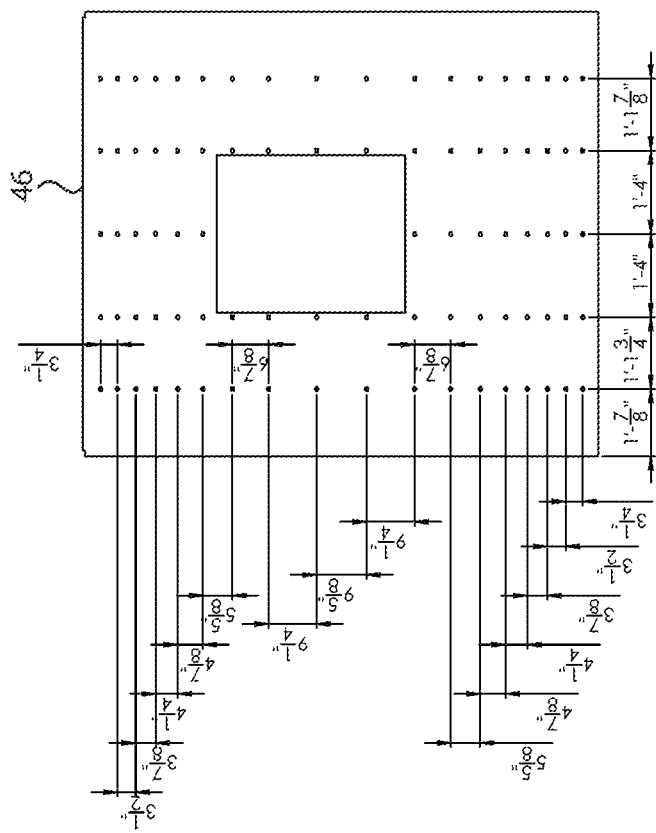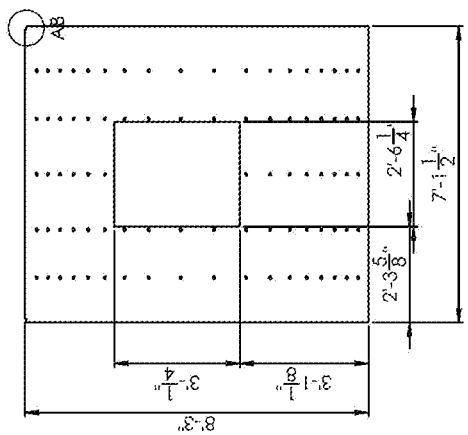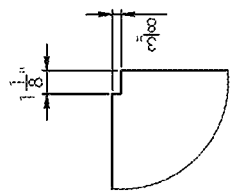
FIG. 44
DETAIL AB
SCALE 1:5
Notch at top right of plate is mirrored to on the top left
Dimensions are in feet and inches - Reference Standards AISC 303-05 and ISO 668:1995(E)
description: interior end wall
weight:
stock size: 1/4" plate
material: ASTM A36

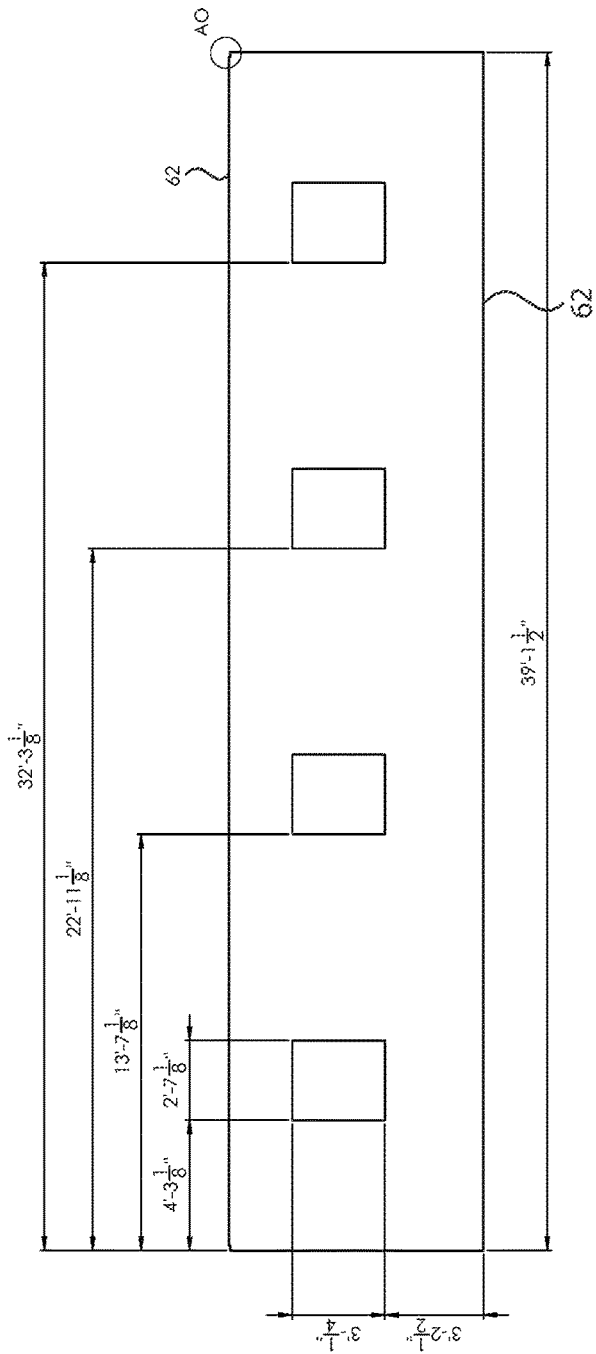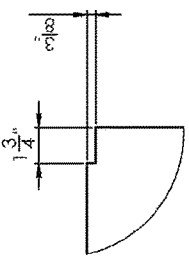

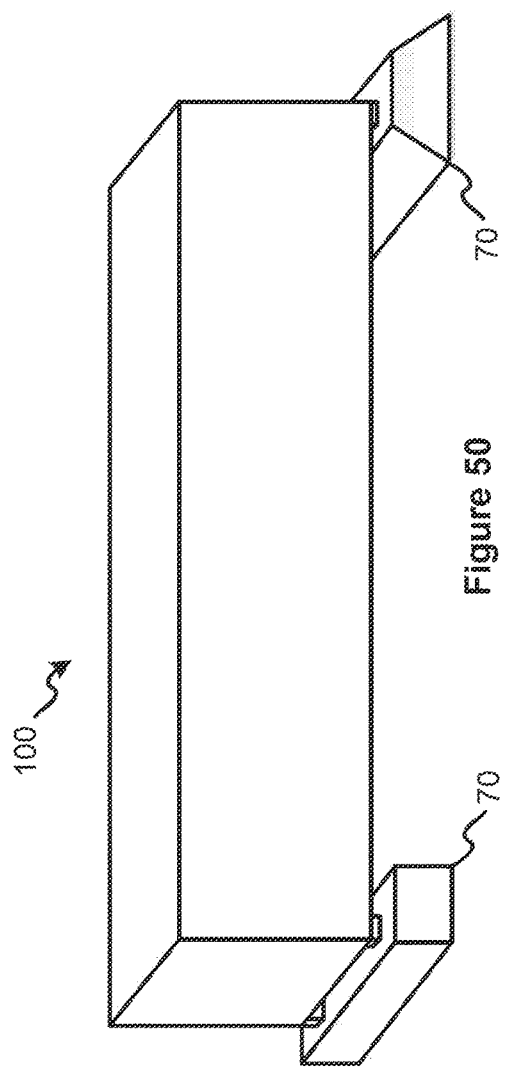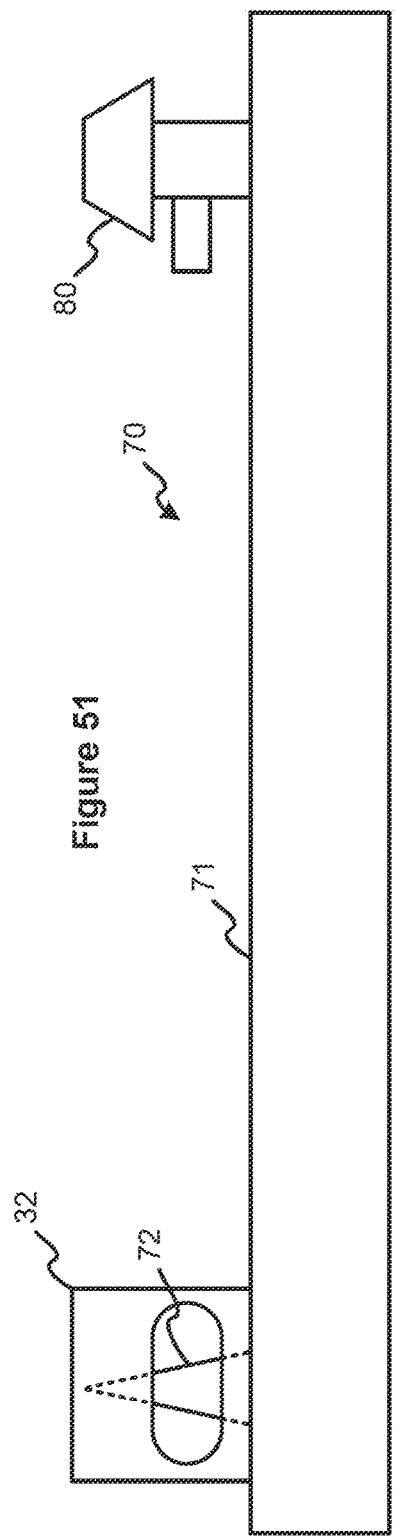

BLAST, BALLISTIC AND FORCED ENTRY RESISTANT SHELTER

CROSS-REFERENCE TO RELATED APPLICATIONS

This patent application is a continuation-in-part and claims the benefit of U.S. patent application Ser. No. 13/886248 filed May 2, 2013, which claims the benefit of U.S. Provisional Application No. 61/641,877 filed May 2, 2012. The above applications are incorporated by reference herein in their entirety.

STATEMENT REGARDING FEDERALLY SPONSORED RESEARCH OR DEVELOPMENT

The invention described herein was made by an employee of the United States Government and may be manufactured and used by the Government of the United States of America for governmental purposes without the payment of any royalties thereon or therefore.

FIELD OF INVENTION

This invention relates to the field of armor and more specifically to construction of armored structures which comply with both ISO and State Department Standards.

BACKGROUND OF THE INVENTION

The U.S. Army Corps of Engineers (USACE) currently uses shipping containers as components for transportable shelters to protect troops from ballistics and explosives. This system is known in the art as a Hardened Alternative Trailer System (HATS).

The HATS structures must comply with the U.S. Department of State Certification Standard for Forced Entry and Ballistic Resistance of Structural Systems, SDSTD01.01, without exceeding stringent ISO weight and dimensional specifications. USACE has conducted considerable laboratory research to develop a HATS shelter which concurrently meets most standards. U.S. patent application Ser. No. 13/886,248 (the '248 Application) teaches precise specifications developed by the government to meet ISO Standard No. 668:2013 for twenty-foot structures.

At present, over four hundred structures having the specifications taught in the '248 Application have been fielded "in theater." At a cost of several hundred thousand USD per structure, this technology represents investment in the range of $100,000,000 to the U.S. government.

Despite the commercial success of the technology taught in the '248 Application, there is an unmet need in the art for a system which complies with the requirements of ISO Standard No. 668:013 for larger forty-foot structures.

BRIEF SUMMARY OF THE INVENTION

An anti-ballistic shelter system includes a base assembly, a top assembly first and second end wall assemblies, and two sidewall assemblies.

The base assembly includes channeled floor/roof support beams extending between floor girders and connected to floor/roof support beams. A floor connects to the floor girders. One of the floor girders has stud apertures spaced 16 inches apart at center.

Each of the channeled floor/roof support beams has a length of 9.59375 feet, a width of 3 inches, a height of 2 inches, and a weight of 7.1 lbs. per foot of length. Each of the floor girders has a length of 39.125 feet and a hollow structural cross-section of 10 by 5 by ⅜ inches. Each of the floor/roof support beams has a length of 7.125 feet and a hollow structural cross-section of by 3 by 3 by ⁵⁄₁₆ inches. The floor has dimensions of 39.5 feet by 7.395833 feet, The top assembly includes channeled floor/roof support beams extending between top girders and connected to floor/roof support beams. A roof connects to and is located above the top girders, while an interior roof connects to and is located below the top girders. The top girders have stud apertures spaced 16 inches apart at center.

The top girders have a length of 39.833 feet and a hollow structural cross-section of 5 by 3 by ½ inches. The roof has dimensions of 39.95833 feet by 7.95833 feet. The interior roof has dimensions of 39.20833 feet by 7.125 feet.

The first end wall assembly includes two ISO right freight container corner fittings and two ISO left freight container corner fittings, with a bottom frame and a top frame connecting the two ISO right freight container corner fittings to the two ISO left freight container corner fittings. Corner columns connect the two ISO right freight container corner fittings and the two ISO left freight container corner fittings. Exterior and interior plates connect to the bottom frame, the top frame, and the corner columns. The bottom frame and the top frame have stud apertures, with wall studs extending through the stud apertures into the bottom frame and the top frame.

The bottom frame has a length of 6.9270833 feet and a hollow structural cross-section of 10 by 5 by ⅜ inches. The top frame has a length of 6.9270833 feet and a hollow structural cross-section of 5 by 3 by ⅜ inches. Each of the corner columns has a height of 9.166 feet and a hollow structural cross-section of 5 by 5 by ⅜ inches. Each of the wall studs has a height of 9.166 feet and a hollow structural cross-section of 3 by 2 by ¼ inches. The exterior plate has dimensions of 7.125 feet by 8.270833 feet. The interior plate has dimensions of 7.125 feet by 8.270833 feet.

The second end wall assembly includes two ISO right freight container corner fittings and two ISO left freight container corner fittings, with a bottom frame end and atop frame end connecting the two ISO right freight container corner fittings to the two ISO left freight container corner fittings. Corner columns connect the two ISO right freight container corner fittings and the two ISO left freight container corner fittings. Exterior and interior end walls connect to the bottom frame end, the top frame end, and the corner columns. The bottom frame end and the top frame end have stud apertures, with wall studs extending through the stud apertures into the bottom frame end and the top frame end.

The bottom frame end has a length of 7.125 feet and a hollow structural cross-section of 10 by 5 by ⅜ inches. The top frame end has a length of 6.9270833 feet and a hollow structural cross-section of 5 by 3 by ½ inches. The exterior end wall has dimensions of 7.125 feet by 8.270833 feet. The interior end wall has dimensions of 7.125 feet by 8.25 feet.

The sidewall assemblies include exterior and interior sidewalls connected to one of the floor girders and the top girder, with wall studs extending into the top girder and one of the floor girders through the stud apertures in the top girder and one of the floor girders. The exterior sidewall has dimensions of 39.125 feet by 8.25 feet while the interior sidewall has dimensions of 39.125 feet by 8.25 feet.

BRIEF DESCRIPTION OF SEVERAL VIEWS OF THE DRAWING(S)

FIGS. 1-49 illustrate the components of an exemplary embodiment of an anti-ballistic shelter unit. FIG. 1 illustrates the unit including a base assembly, a top assembly, an end wall assembly with door, an endwall assembly with window, and sidewall assemblies with windows.

FIG. 2 illustrates the base assembly including floor girders floor/roof support beams, channeled floor/roof support beams, and floor. FIGS. 3 and 4 illustrate floor girders. FIG. 5 illustrates the floor/roof support beam. FIG. 6 illustrates the channeled floor/roof support beam. FIG. 7 illustrates the floor. FIG. 8 illustrates base assembly welds.

FIG. 9 illustrates the top assembly including floor/roof support beams, channeled floor/roof support beams, top girders, roof, and interior roof. FIGS. 10 and 11 illustrate the top girder. FIG. 12 illustrates the roof. FIG. 13 illustrates the interior roof. FIG. 14 illustrates the top assembly welds.

FIG. 15 illustrates the end wall assembly with door, including ISO right freight container corner fitting, ISO left freight container corner fitting, door frame assembly, bottom frame for middle door, corner column, top frame for middle door, wall stud, exterior plate for middle door, and interior plate for middle door. FIG. 16 illustrates a cross section of end wall assembly with door. FIG. 17 illustrates the ISO right freight container corner fitting. FIG. 18 illustrates the ISO left freight container corner fitting. FIGS. 19-20 illustrate door frame assembly, vertical door frame, and door header. FIG. 21 illustrates the door frame assembly welds. FIG. 23 illustrates the bottom frame for middle door. FIG. 24 illustrates the corner column. FIG. 25 illustrates the top frame for middle door. FIG. 26 illustrates the wall stud. FIG. 27 illustrates the exterior plate for middle door. FIG. 28 illustrates the interior plate for middle door. FIG. 29-31 illustrate the end wall with door welds.

FIG. 32 illustrates the end wall assembly with window, including bottom frame end, top frame end, wall studs, bottom jack studs, top jack studs, exterior end wall, interior end wall, and window frame assembly. FIG. 33 illustrates the bottom frame end. FIG. 34 illustrates the top frame end. FIG. 35 illustrates the window frame assembly. FIG. 36 illustrates the horizontal window frame. FIG. 37 illustrates the vertical window frame. FIG. 38 illustrates the vertical window molding. FIG. 39 illustrates the horizontal window molding. FIG. 40 illustrates the window frame assembly welds. FIG. 41 illustrates the bottom jack stud. FIG. 42 illustrates the top jack stud. FIG. 43 illustrates the exterior end wall. FIG. 44 illustrates the interior end wall. FIG. 45 illustrates a cross section of the end wall assembly with window.

FIG. 46 illustrates the sidewall assembly with windows, window frame assemblies, wall studs, bottom jack studs, top jack studs, interior sidewall, and exterior sidewall. FIG. 47 illustrates the interior sidewall with punchouts. FIG. 48 illustrates the exterior sidewall with cutouts. FIG. 49 illustrates the sidewall assembly with windows welds.

FIGS. 50 and 51 illustrate looter components of an exemplary embodiment of the anti-ballistic shelter unit.

TERMS OF ART

As used herein, the term "hollow structural cross-section" refers to a measurement of a hollow member including, a first dimension, a second dimension, and a wall thickness.

As used herein, the term "inches apart at center" refers to the distance between the centers of spaced structures.

As used herein, the term "ISO freight container corner fitting" refers to a cast metal fitting forming the corner of a structure, having a hollow interior and at least one elongated aperture allowing insertion of the mobile portion, of a twistlock.

As used herein, the term "twistlock" refers to a two- or three-portion connector, wherein at least one mobile portion of the connector may be inserted into an elongated aperture in a structure and rotated to prevent removal of the mobile portion from the elongated aperture and separation of the connector from the structure.

As used herein, the term "welding interface" refers to a joint created by welding to or more pieces of metal together.

As used herein, the term "welding scaffold" refers to a removable frame work used to hold the components of a welded structure in place during fabrication.

DETAILED DESCRIPTION OF THE INVENTION

Figure 1:
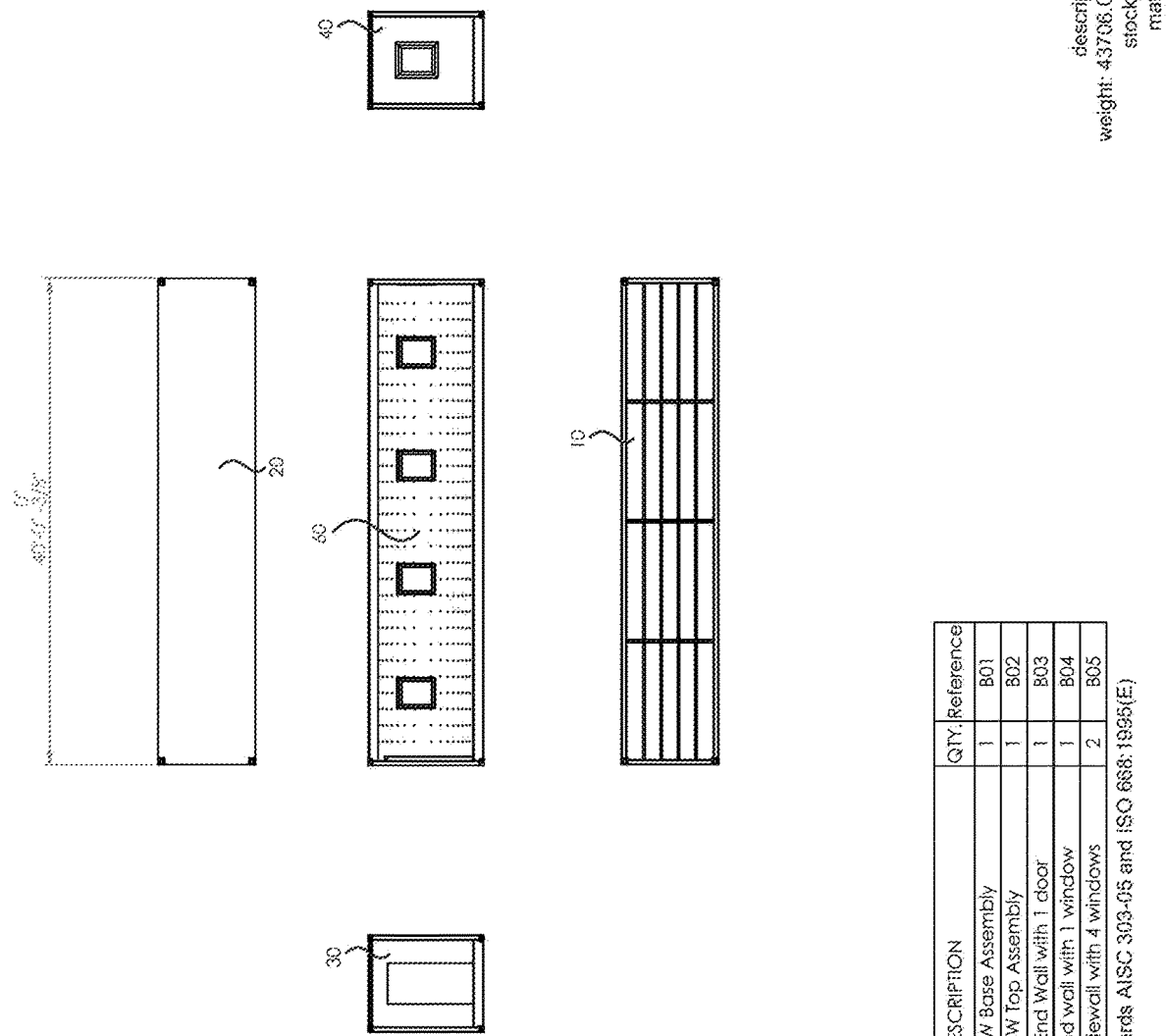

FIGS. 1-49 illustrate the components of an exemplary embodiment anti-ballistic shelter unit 100. FIG. 1 illustrates unit 100 including base assembly 10, top assembly 20, endwall assembly 30 with door, endwall assembly 40 with window, and sidewall assemblies 60 with windows. Unit 100 has a weight of approximately 58,970 lbs., well within the requirements for ISO containers.

FIG. 2 illustrates base assembly 10 including floor girders 11, floor/roof support beams 12, channeled floor/roof support beams 13, and floor 14. Base assembly 10 has a weight of approximately 6,900 lbs.

Figure 3:
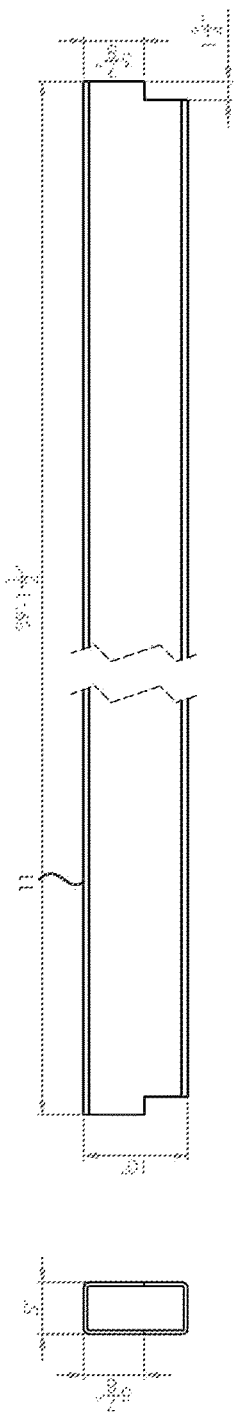
Figure 4:
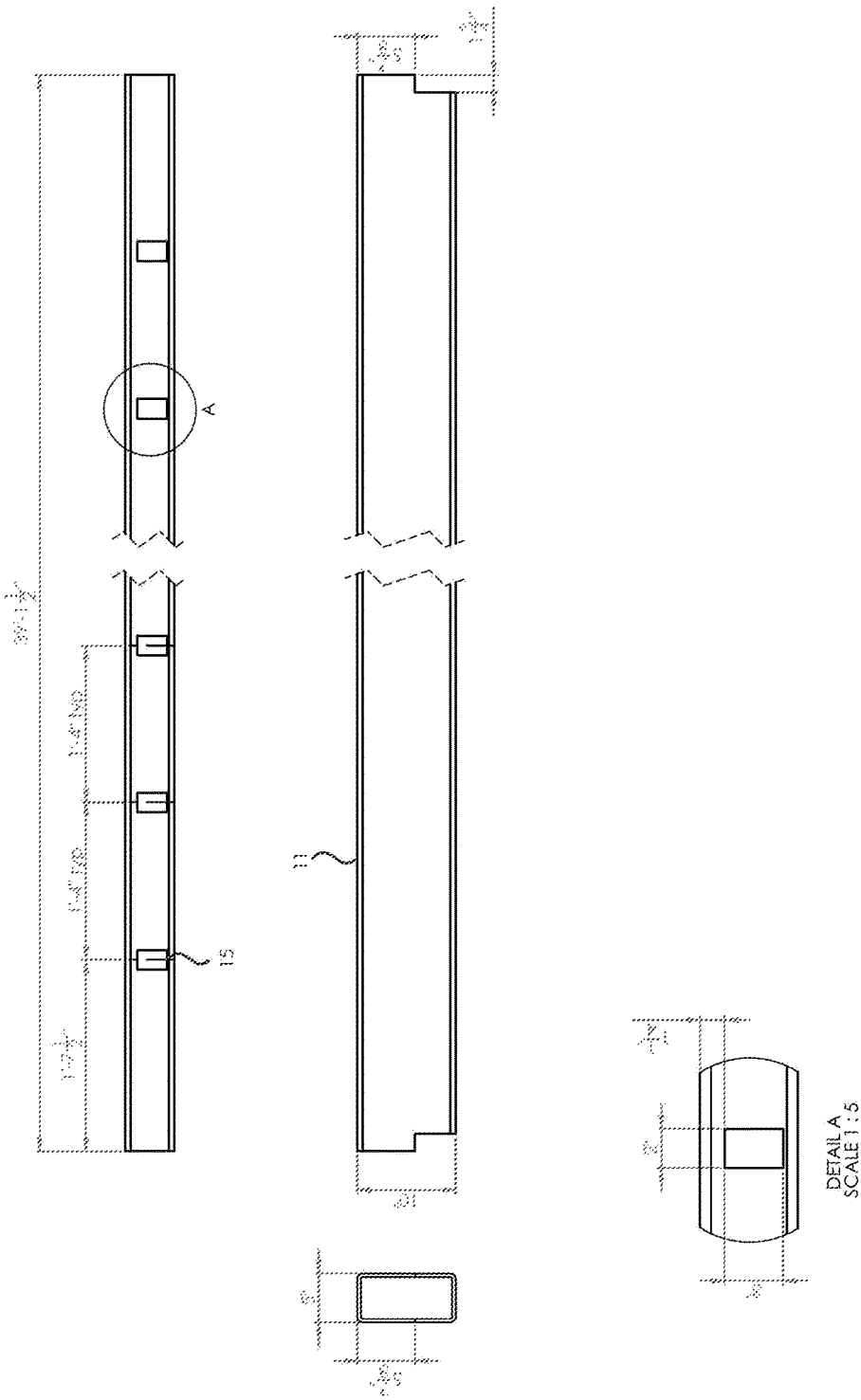
Figure 5:
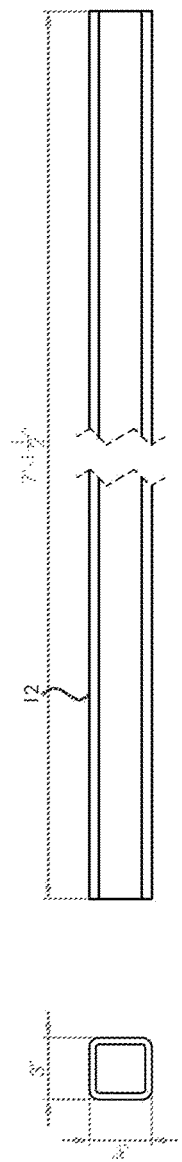
Figure 6:
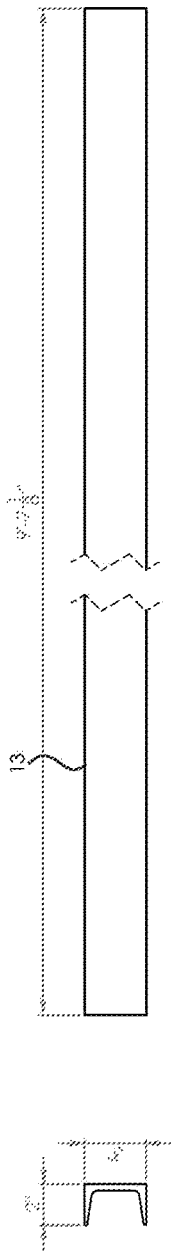
Figure 7:
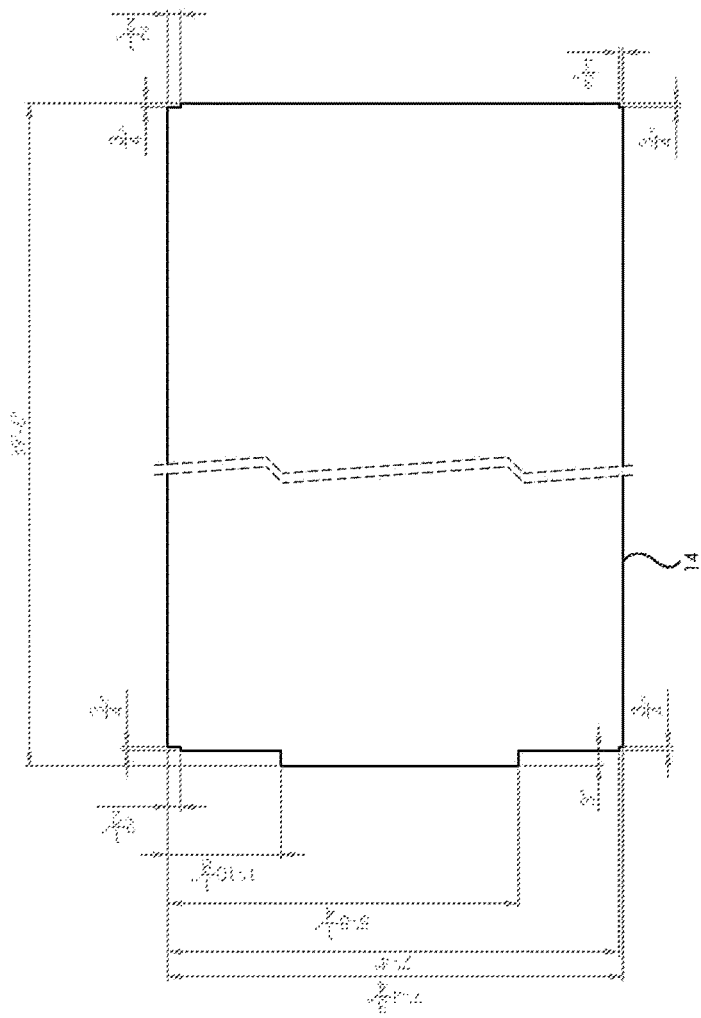
Figure 8:
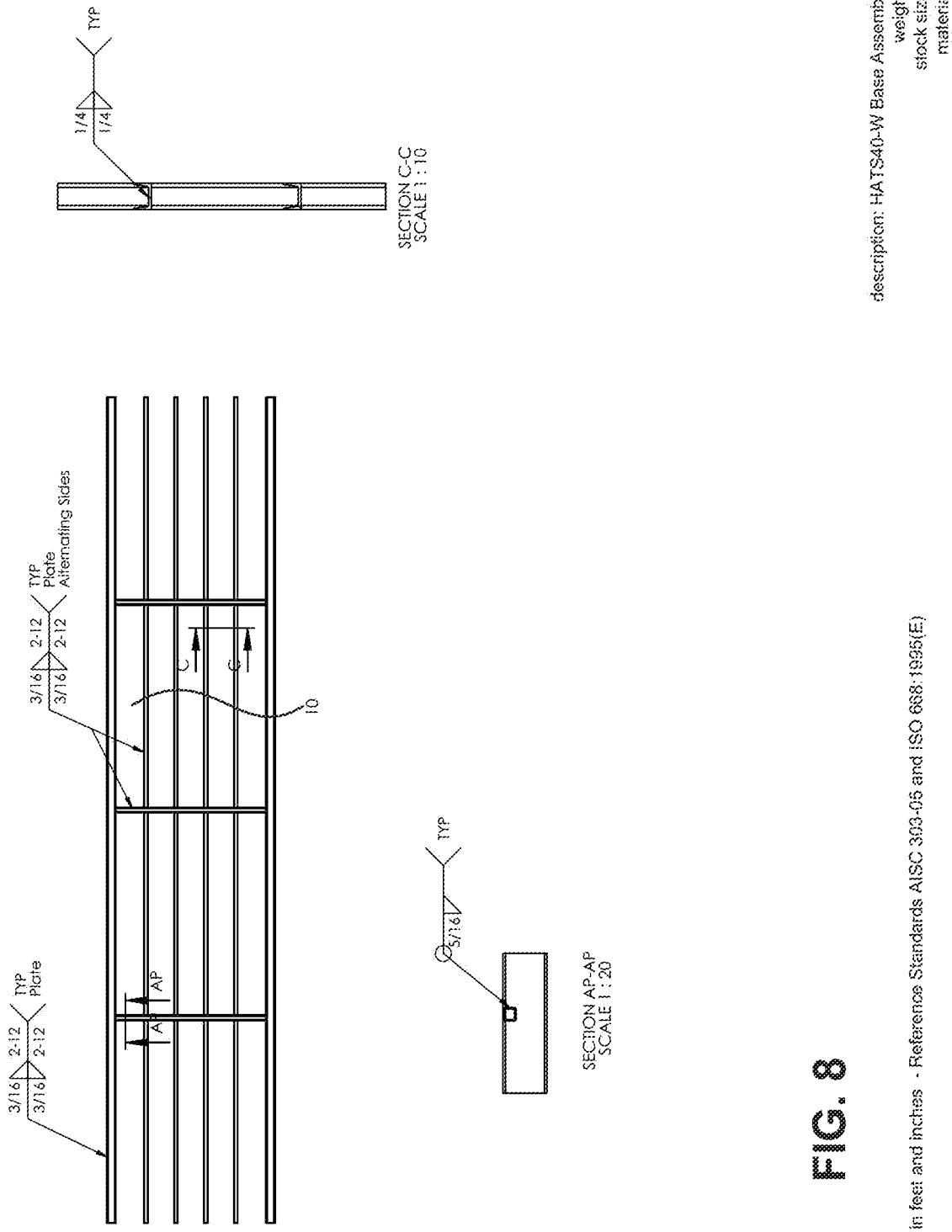

FIGS. 3 and 4 illustrate floor girders 11, which have a length of 39.125 feet and a hollow structural cross-section of 10 by 5 by ⅜ inches. As seen in FIG. 4, floor girder 11 may include multiple stud apertures 15 spaced apart 16 inches apart at center. This critical dimension provides optimum structural integrity to any assembly utilizing stud apertures 15 without increasing weight to the point that it violates ISO standards. FIG. 5 illustrates floor/roof support beam 12, which has a length of 7,125 feet and a hollow structural cross-section of 3 by 3 by 5/16 inches. FIG. 6 illustrates channeled floor/roof support beam 13, which has a length of 9.59375 feet, a width of 3 inches, a height of 2 inches, and a weight of 7.1 lbs. per foot of length. FIG. 7 illustrates floor 14, which has dimensions of 39.5 feet by 7.395833 feet. FIG. 8 illustrates base assembly 10 welds.

FIG. 9 illustrates top assembly 20 including floor/roof support beams 12, channeled floor/roof support beams 13, top girders 21, roof 23, and interior roof 24. Top assembly 20 has a weight of approximately 13,719 lbs.

Figure 11:
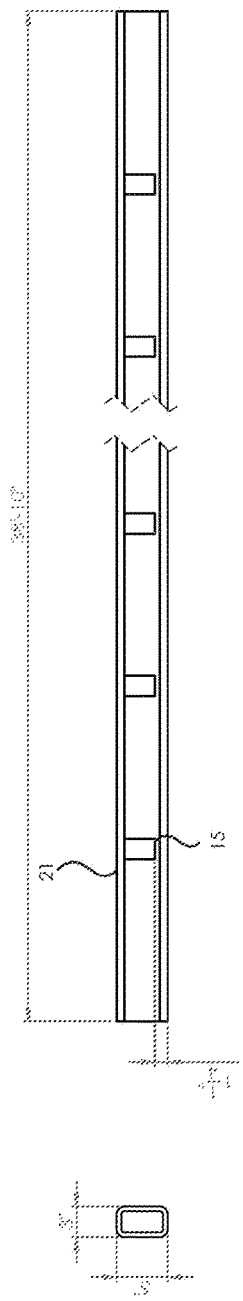
Figure 12:
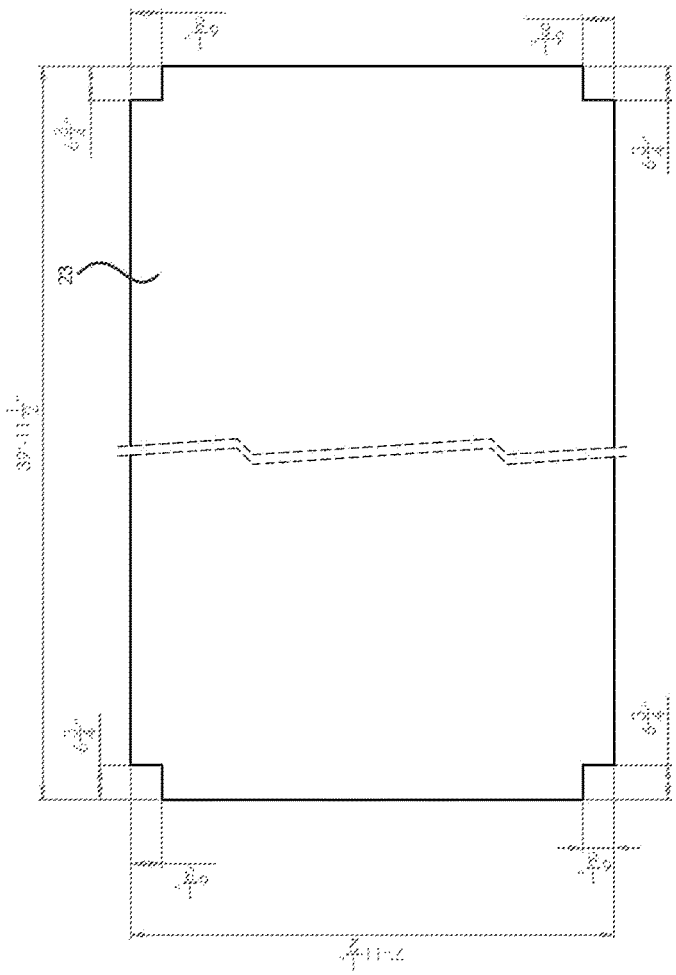
Figure 13:
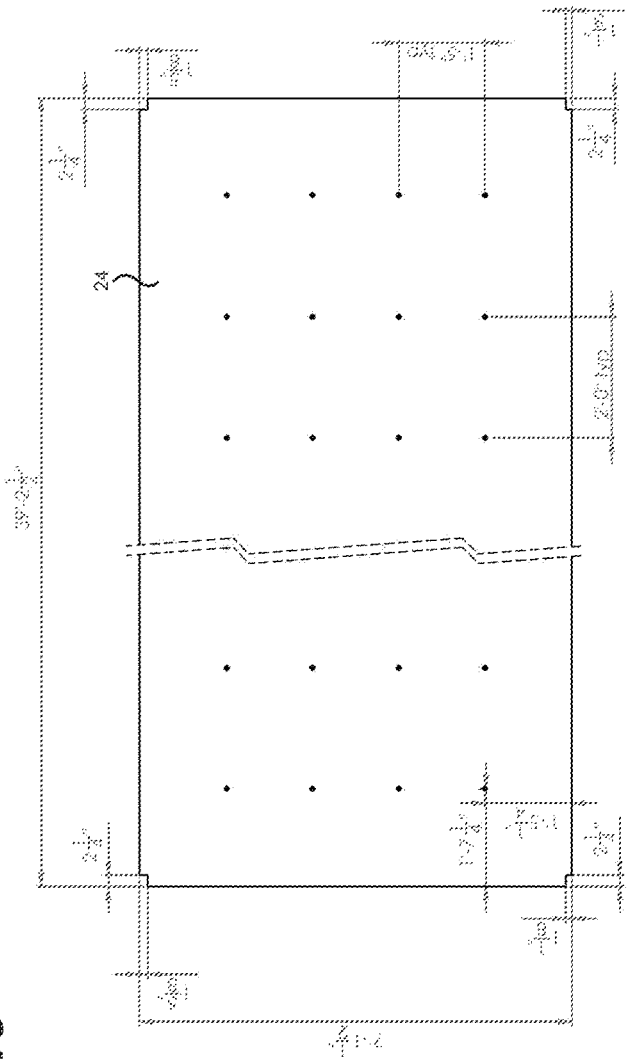

FIGS. 10 and 11 illustrate top girder 21, which has a length of 39.833 feet and a hollow structural cross-section of 5 by 3 by ½ inches. Top girder 21 includes multiple stud apertures 15 spaced apart 16 inches apart at center. FIG. 12 illustrates roof 23, which has dimensions of 39.95833 feet by 7.95833 feet. FIG. 13 illustrates interior roof 24, which has dimensions of 39.20833 feet by 7.125 feet. FIG. 14 illustrates top assembly 20 welds.

Figure 15:
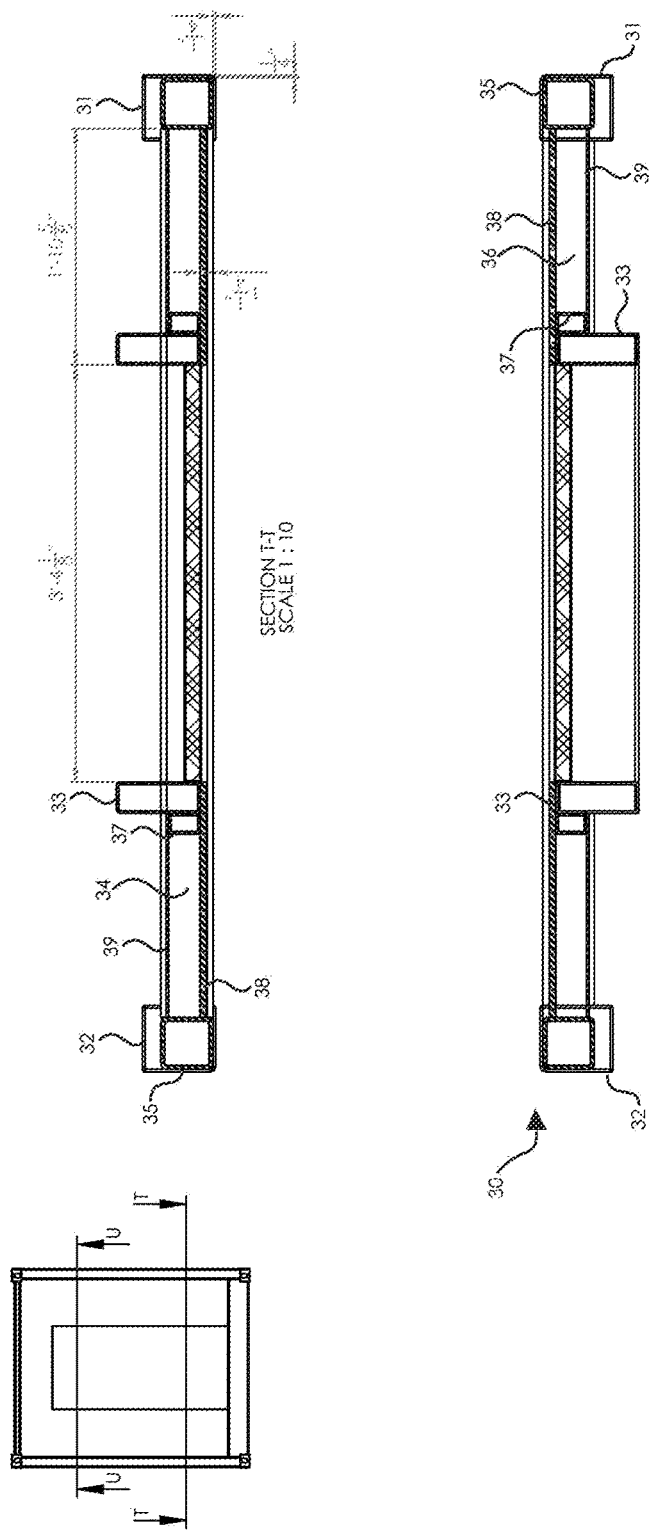

FIG. 15 illustrates end wall assembly 30 with door, including ISO right freight container corner fitting 31, ISO left freight container corner fitting 32, door frame assembly 33, bottom frame 34 for middle door, corner column 35, top frame 36 for middle door, wall studs 37, exterior plate 38 for middle door, and interior plate 39 for middle door. In the exemplary embodiment, end wall assembly 30 with door has a weight, of approximately 5,472 lbs.

Exterior plate for middle door 38 and interior plate for middle door 39 are made from sheets of steel 0.0625 inches to 1 inch thick. Thicker sheets (0.5 inches to 1 inch thick)

may be used for units 100 which will see deployment in areas where more protection may be needed. In embodiments without openings in an endwall assembly, additional wall studs 37 may be added, and exterior end plate 38 and interior plate 39 have neither punchouts nor cutouts for insertion of door frame assembly 33.

Figure 16:
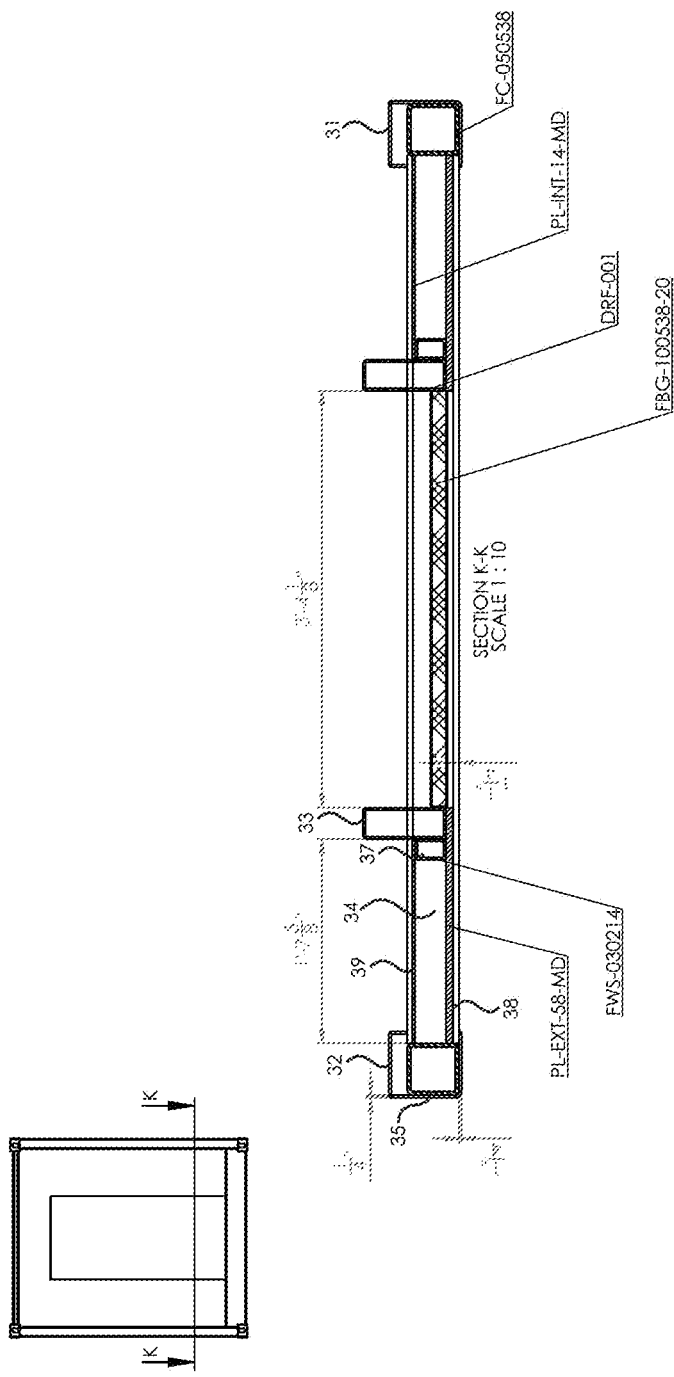
Figure 17:
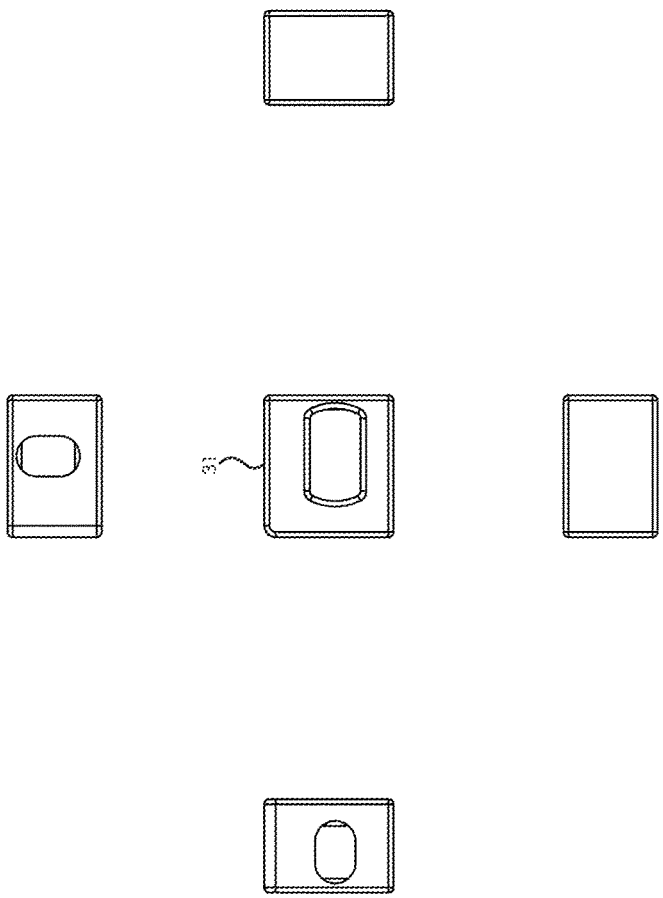
Figure 18:
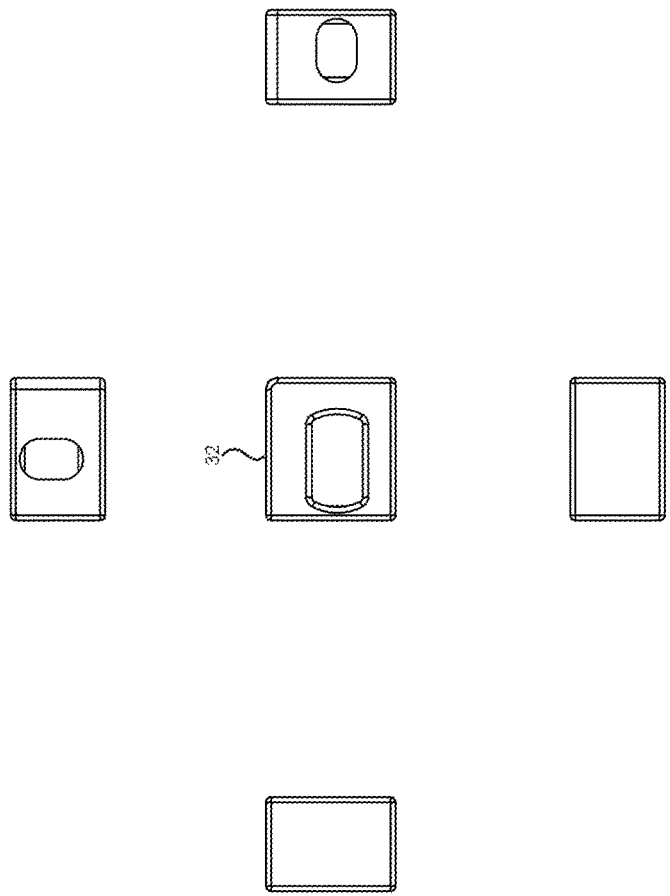
Figure 19:
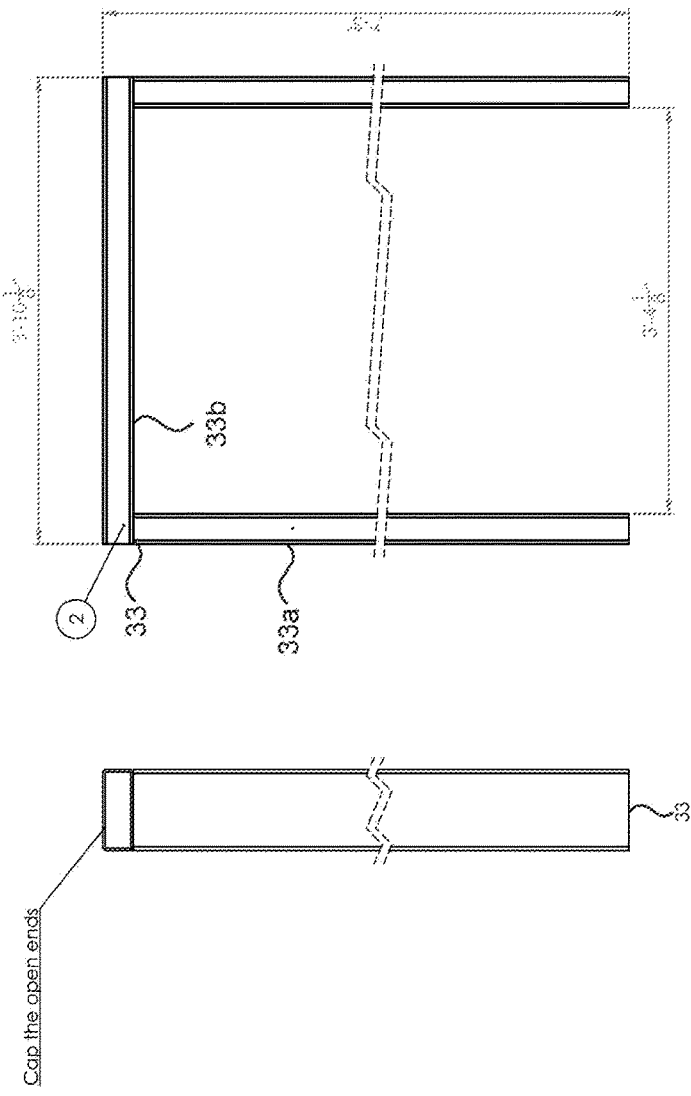
Figure 20:
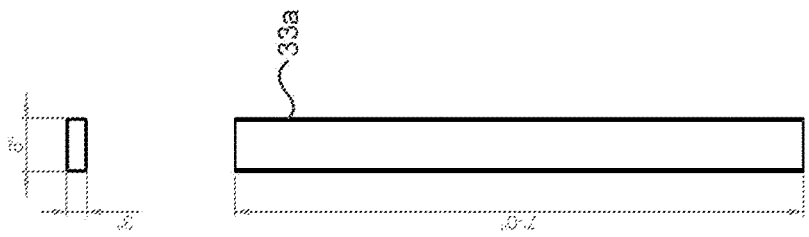
Figure 21:
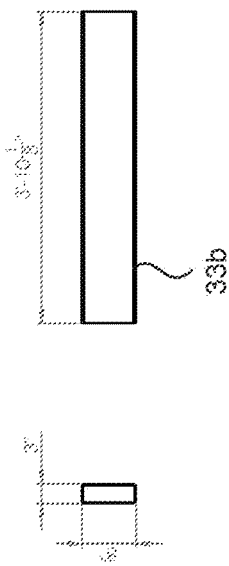
Figure 22:
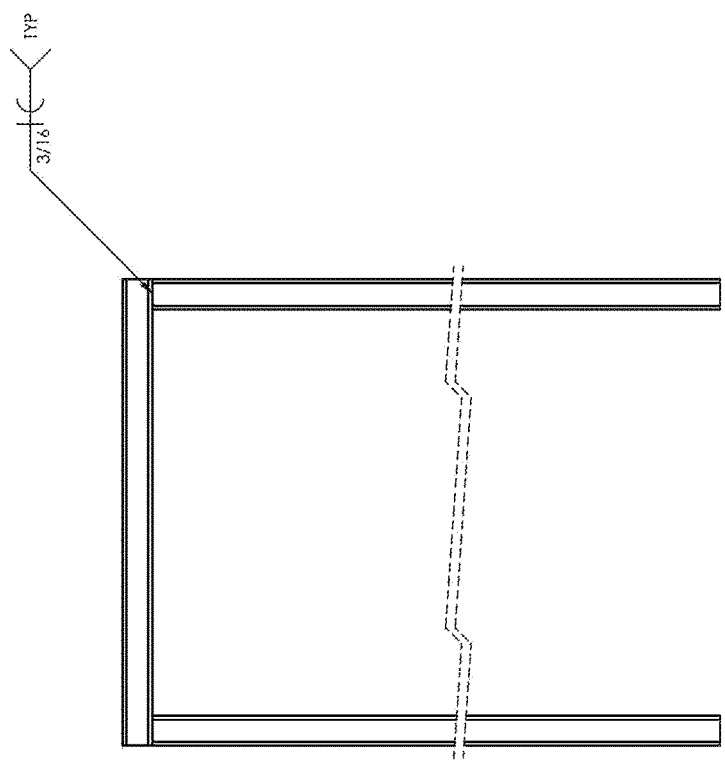
Figure 23:
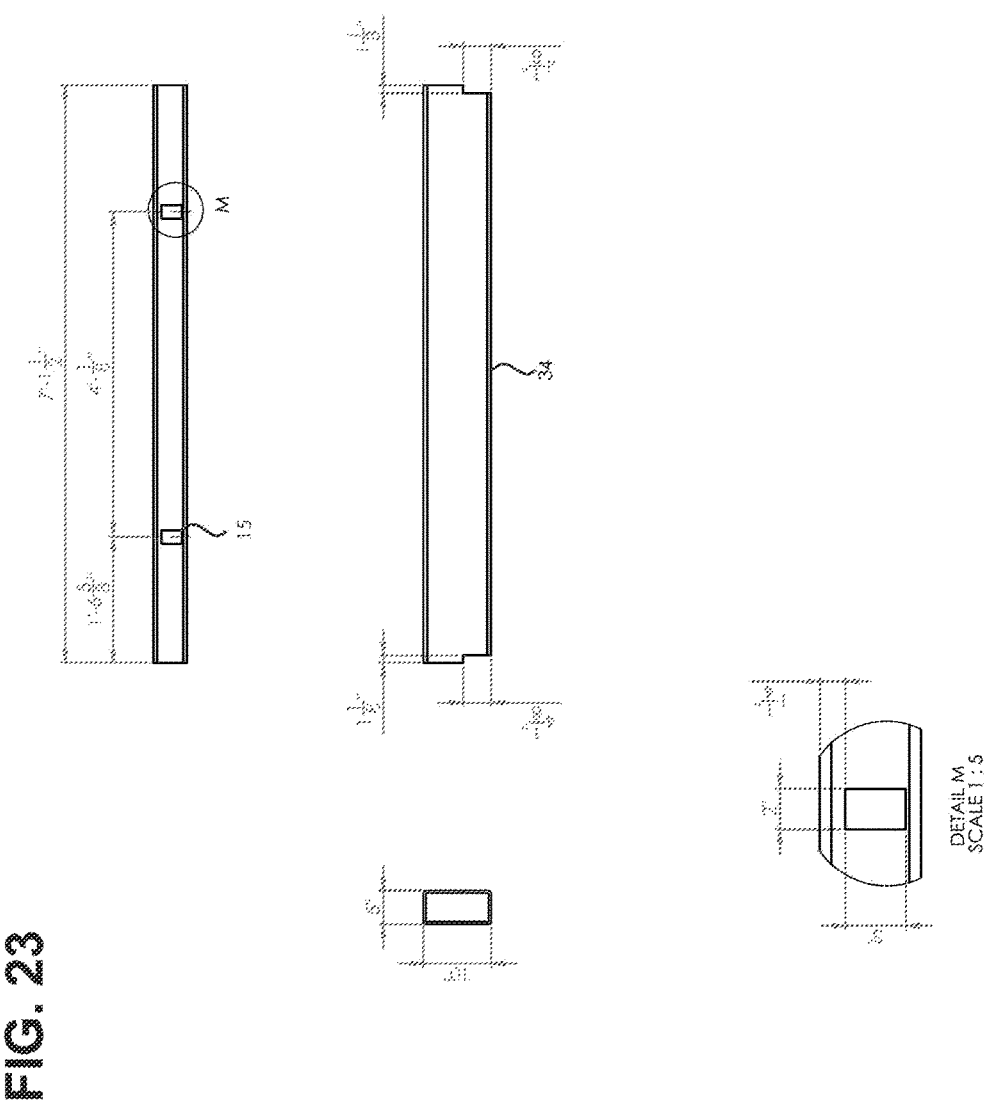
Figure 24:
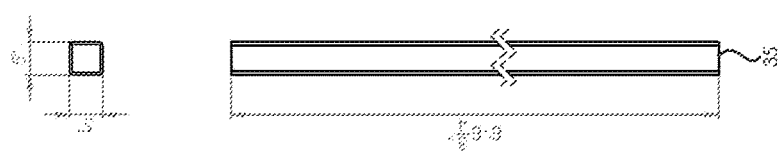
Figure 25:
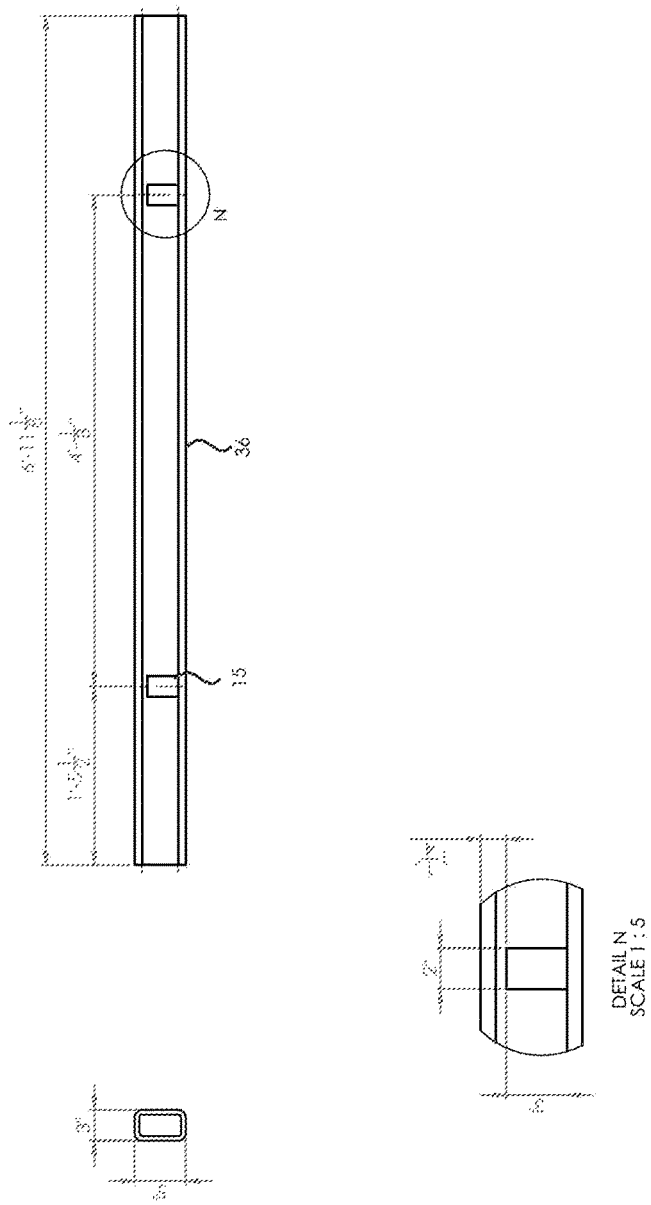

FIG. 16 illustrates a cross section of end wall assembly 30 with door. FIG. 17 illustrates ISO right freight container corner fitting 31. FIG. 18 illustrates ISO left freight container corner fitting 32. FIG. 19 illustrates door frame assembly 33, which includes two vertical door frames 33*a* and one door header 33*b*. Door frame assembly 33 has a height of 7.25 feet and a width of 3.84375. FIG. 20 illustrates vertical door frame 33*a*, which has a height of 7 feet and a hollow structural cross-section of 8 by 3 by ¼ inches. FIGS. 21 illustrates door header 33*b*, which has a length of 3.84375 feet and a hollow structural cross-section of 8 by 3 by ¼ inches. FIG. 22 illustrates door frame assembly 33 welds. FIG. 23 illustrates bottom frame 34 for middle door, which has a length of 6.9270833 feet and a hollow structural cross-section of 10 by 5 by ⅜ inches. Bottom frame 34 for middle door includes multiple stud apertures 15, FIG. 24 illustrates corner column 35, which has a height of 9.166 feet and a hollow structural cross-section of 5 by 5 by ⅜ inches. FIG. 25 illustrates top frame 36 for middle door, which has a length of 6.9270833 feet and a hollow structural cross-section of 5 by 3 by ⅜ inches. Top frame for middle door 36 includes multiple stud apertures 15.

Figure 26:
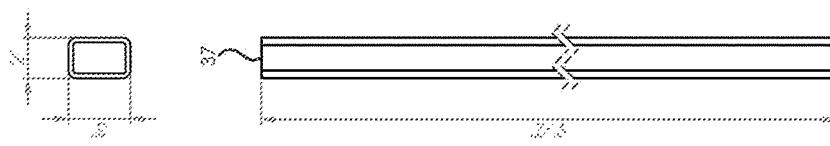
Figure 29:
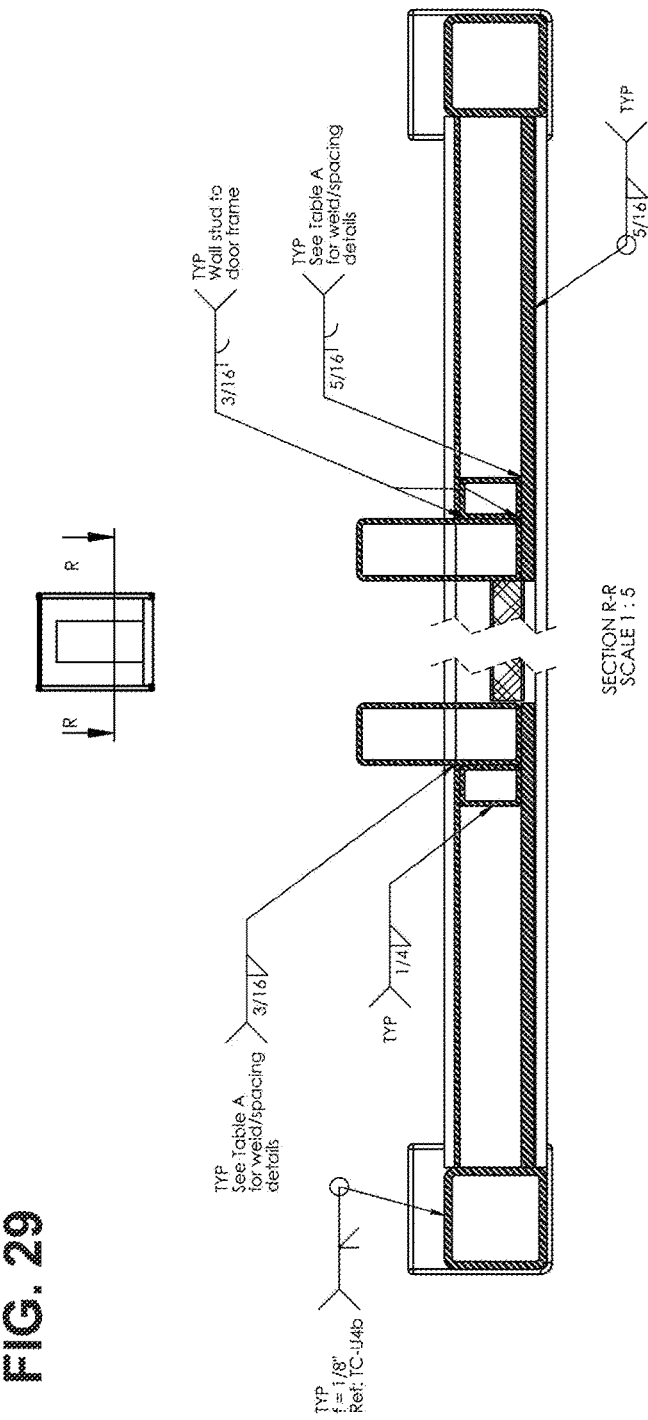
Figure 30:
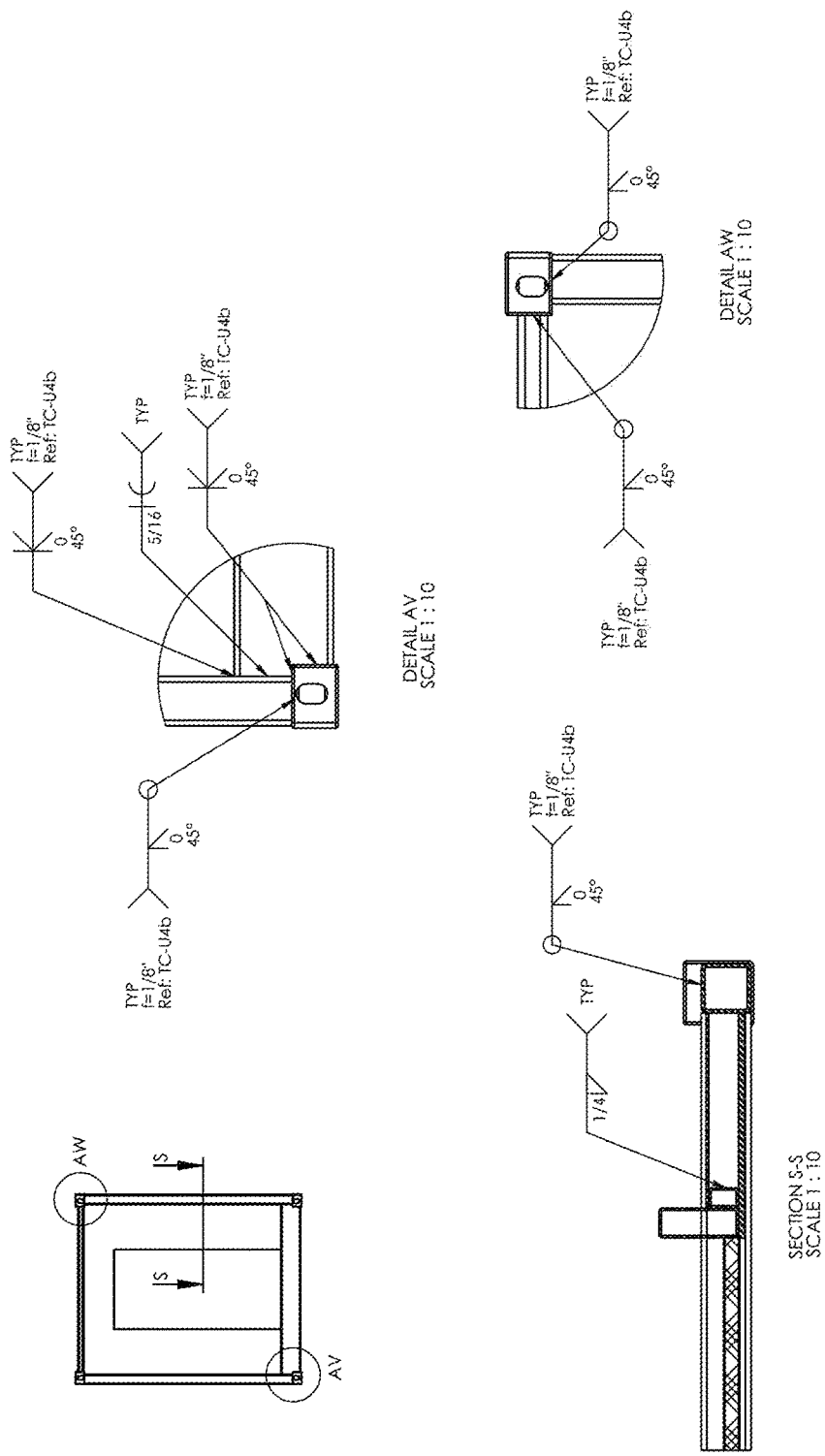

FIG. 26 illustrates wall stud 37, which has a height of 9.166 feet and a hollow structural cross-section of 3 by 2 by ¼ inches. Wall studs 37 are inserted into stud apertures 15 and welded into place during assembly. Wall studs 37 provide critical anti-ballistic, -blast, and -forced entry properties. FIG. 27 illustrates exterior plate 38 for middle door, which has dimensions of 7.125 feet by 8.270833 feet. FIG. 28 illustrates interior plate 39 for middle door, which has dimensions of 7.125 feet by 8.270833 feet. FIG. 29-31 illustrate end wall with door 30 welds.

Figure 32:
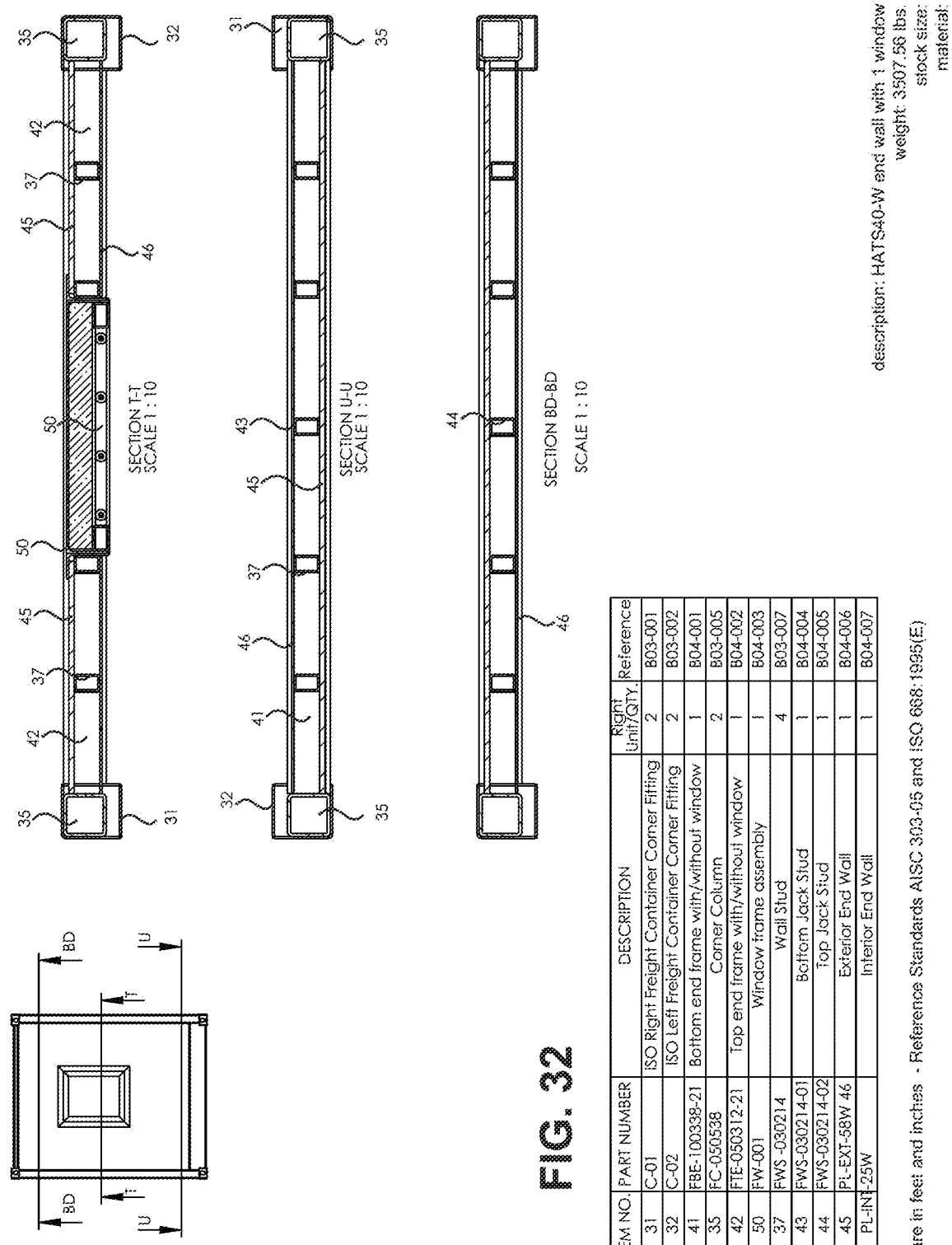

FIG. 32 illustrates end wall assembly 40 with window, including bottom frame end 41, top frame end 42, wall studs 37 bottom jack studs 43, top jack studs 44, exterior end wall 45, interior end wall 46, and window frame assembly 50. In the, exemplary embodiment, end wall assembly 40 with window has a weight of approximately 3,507 lbs.

In the exemplary embodiment, exterior end wall 45 and interior end wall 46 are made from sheets of steel 0.0625 inches to 1 inch thick. Thicker sheets (0.5 inches to 1 inch thick) may be used for units 100 which will see deployment in areas where more protection may be needed. In embodiments without openings in an endwall assembly, wall studs 37 replace bottom jack studs 43 and top jack studs 44, and exterior end wall 45 and interior end wall 46 have neither punchouts nor cutouts for insertion of window frame assembly 50.

Figure 33:
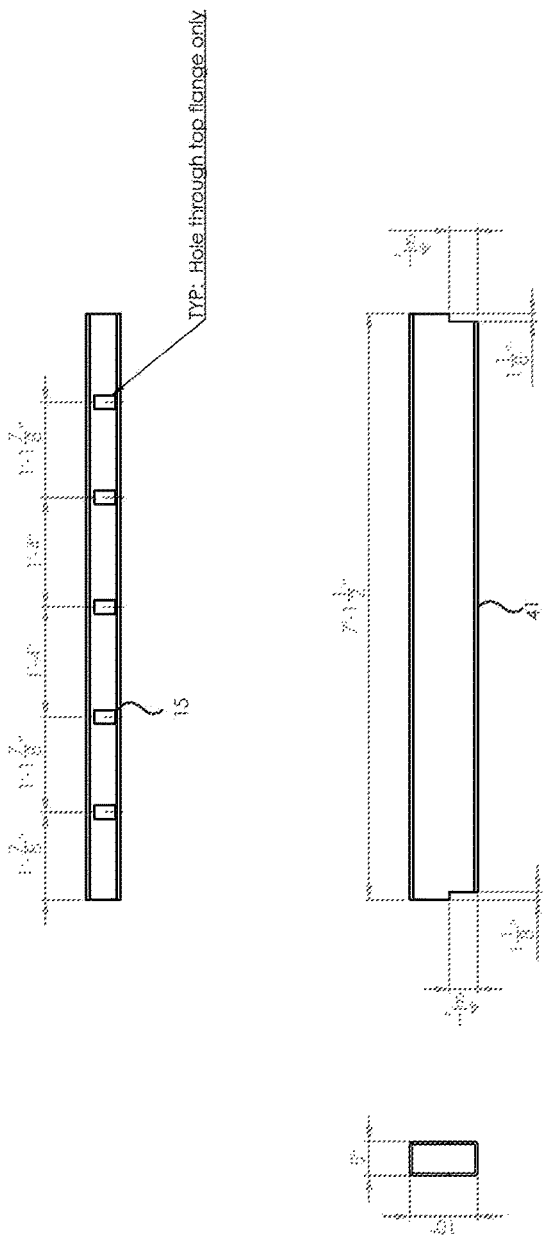
Figure 34:
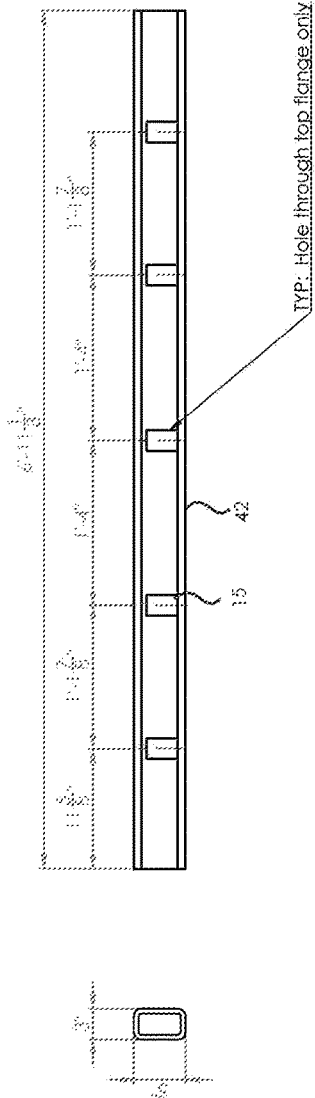

FIG. 33 illustrates bottom frame end 41 which has a length of 7.125 feet and a hollow structural cross-section of 10 by 5 by ⅜ inches. Bottom frame end 41 includes multiple stud apertures 15. FIG. 34 illustrates top frame end 42, which has a length of 6.9270833 feet and a hollow structural cross-section of 5 by 3 by ½ inches. Top frame end 42 includes multiple stud apertures 15.

Figure 35:
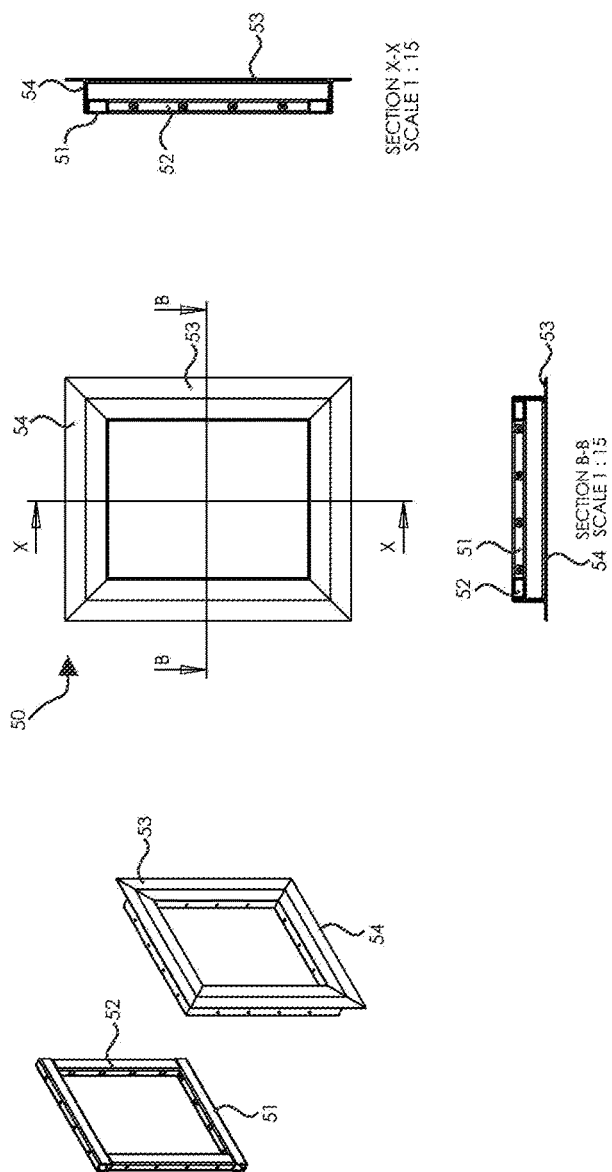
Figure 36:
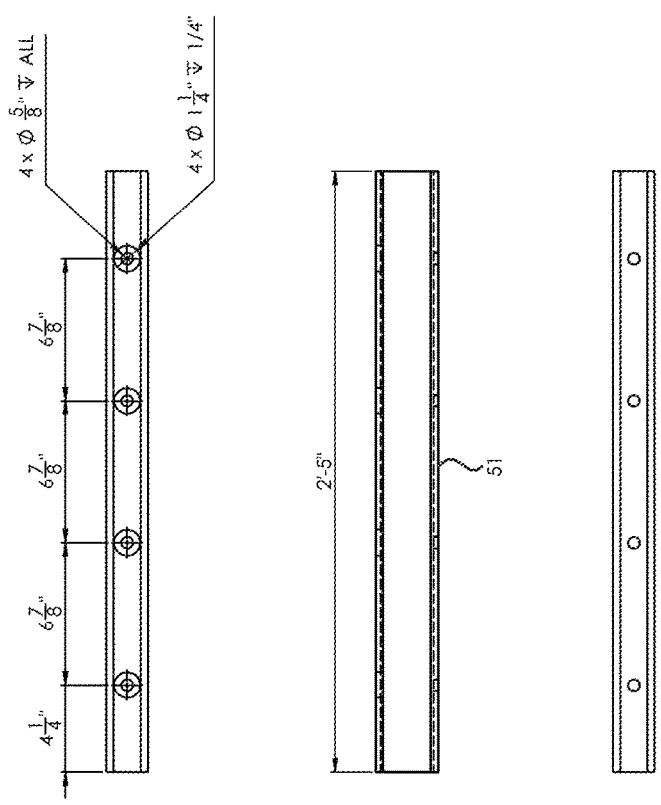
Figure 37:
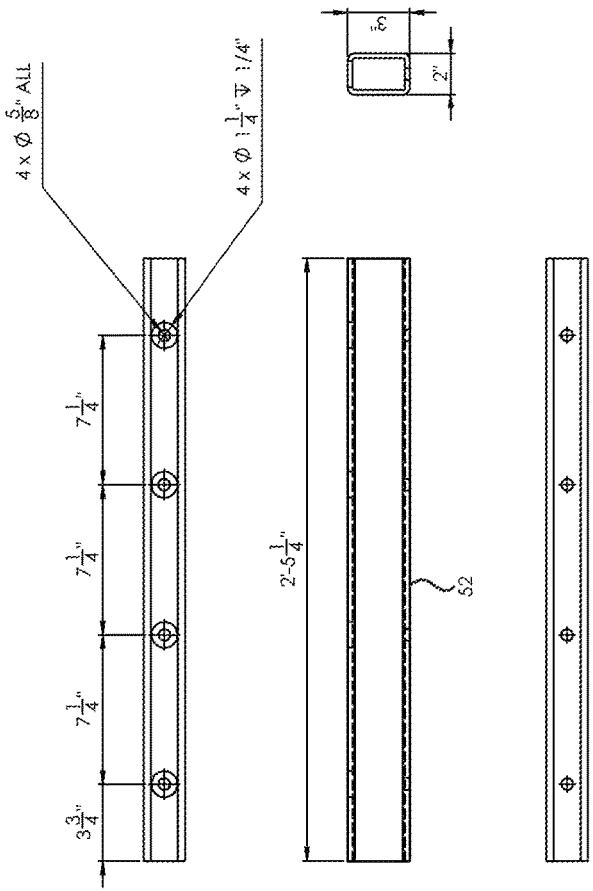
Figure 39:
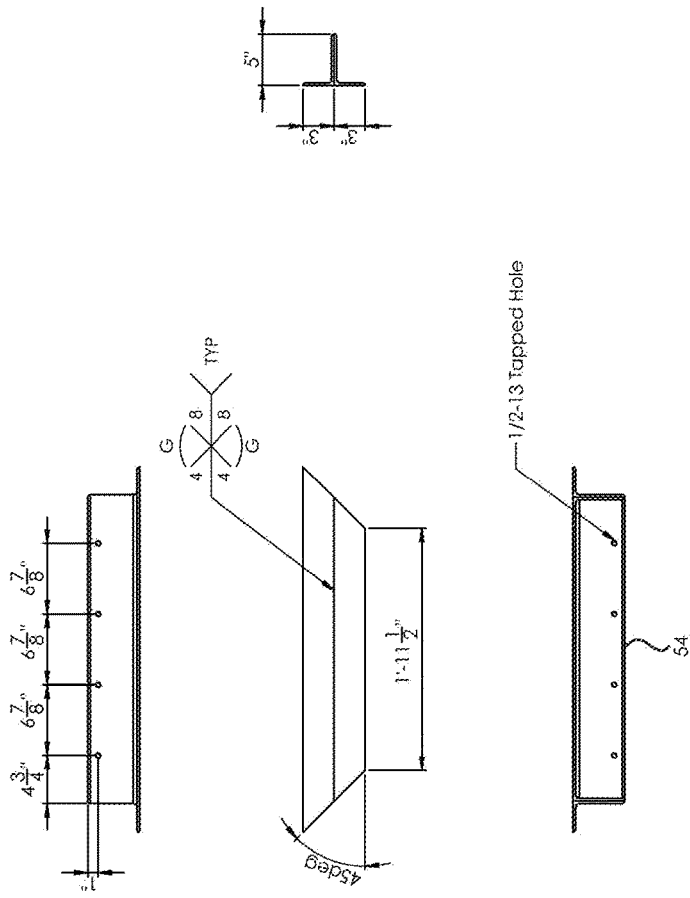
Figure 40:
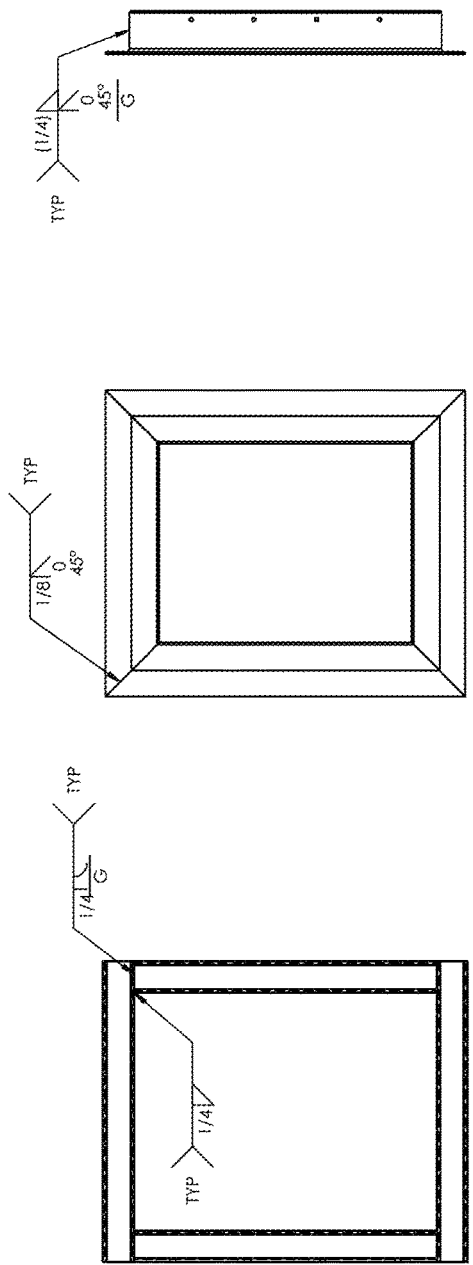

FIG. 35 illustrates window frame assembly 50. which includes horizontal window frames 51, vertical window frames, 52, vertical window moldings 53, and horizontal window moldings 54. FIG. 36 illustrates horizontal window frame 51 which has a length of 2.4166 feet and a hollow structural cross-section of 3 by 2 by ¼ inches. FIG. 37 illustrates vertical window frame 52, which has a length of 2.4375 feet and a hollow structural cross-section of 3 by 2 by ¼ inches. FIG. 38 illustrates vertical window molding 53. FIG. 39 illustrates horizontal window molding 54. FIG. 40 illustrates window frame assembly 50 welds. Window frame assembly 50 also includes glass or another transparent material.

Figure 41:
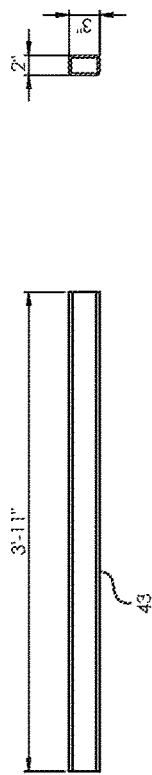
Figure 42:
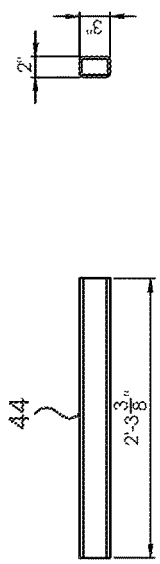
Figure 45:
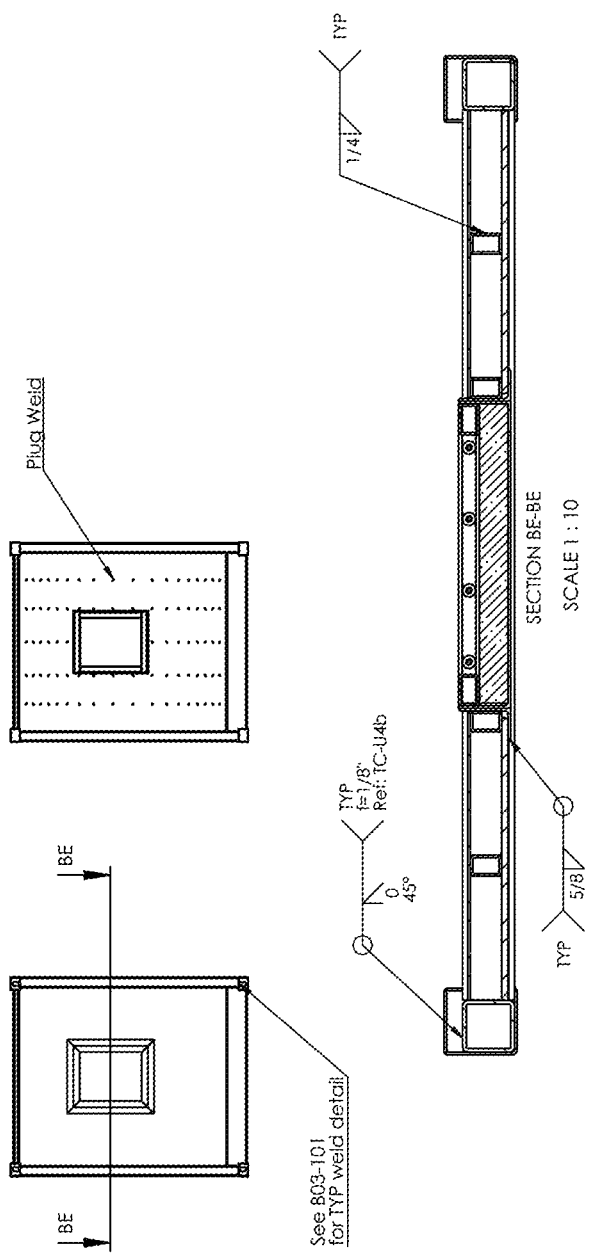

FIG. 41 illustrates bottom jack stud 43 which has a height of 3.9166 feet and a hollow structural cross-section of 3 by 2 by ¼ inches. Bottom jack studs 43 are inserted into stud apertures 15 and, welded into place during assembly. Bottom jack studs 43, similarly to wall studs 37, provide critical anti-ballistic, -blast, and -forced entry properties for areas which include a window assembly 50. FIG. 42 illustrates top jack stud 44, which has a height of 2.28125 feet and a hollow structural cross-section of 3 by 2 by ¼ inches. Top jack studs 44 are inserted into stud apertures 15 and welded into place during assembly. Top jack studs 44, similarly to wall studs 37 and bottom jack studs 43, provide critical anti-ballistic, -blast, and -forced entry properties. FIG. 43 illustrates exterior end wall 46, which has dimensions of 7.125 feet by 8.270833 feet. FIG. 44 illustrates interior end wall 47, which has dimensions of 7.125 feet by 8.25 feet. FIG. 45 illustrates a cross section of end wall assembly 40 with window.

Figure 46:
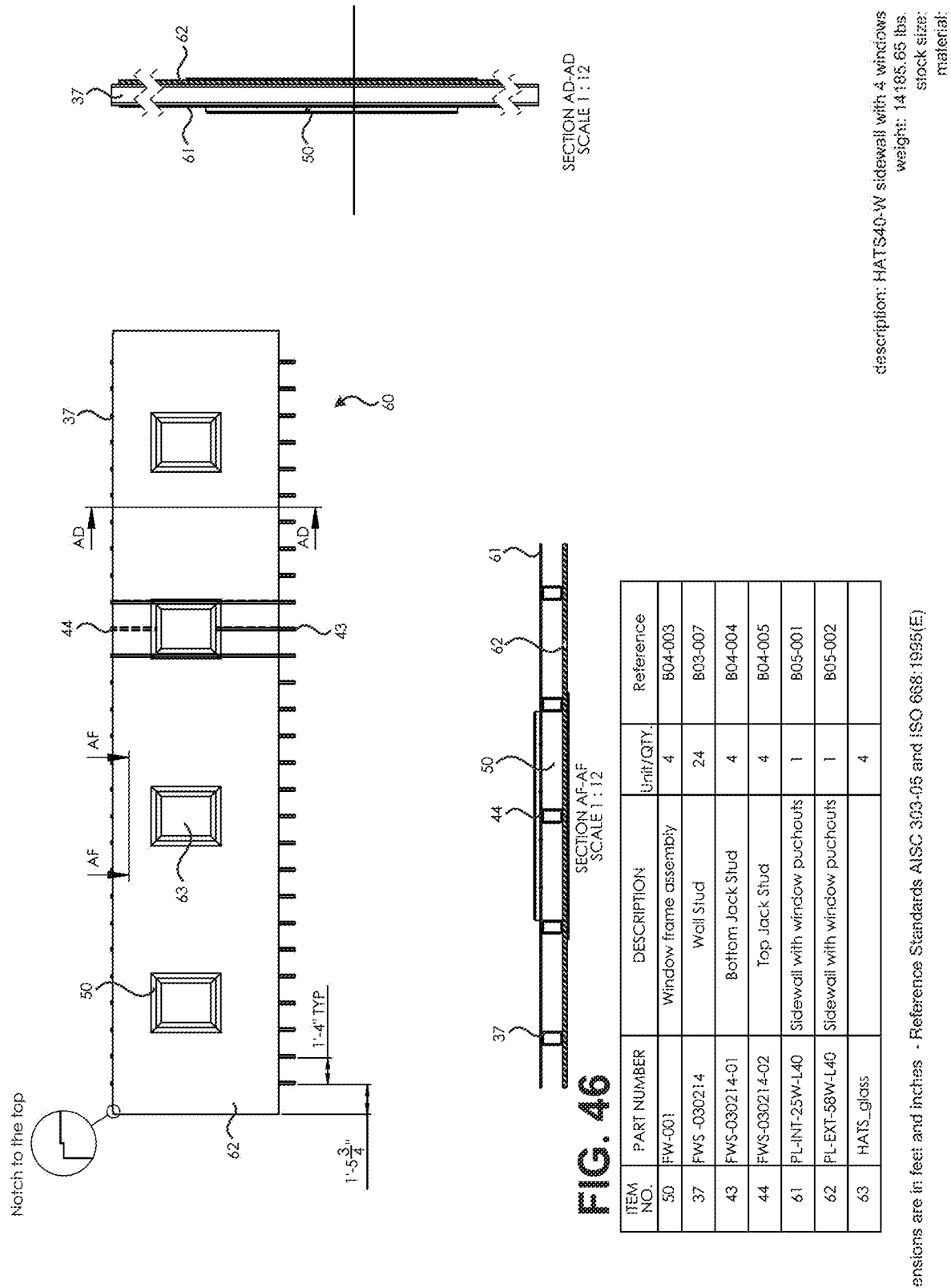

FIG. 46 illustrates sidewall assembly 60 with windows, window frame assemblies 50, wall studs 37, bottom jack studs 43, top jack studs 44, interior sidewall 61 with punchouts, and exterior sidewall 62 with cutouts. In the exemplary embodiment, each sidewall assembly 60 with windows has a weight of approximately 14.185 lbs.

In the exemplary embodiment, interior sidewall 61 and exterior sidewall 62 are made from sheets of steel 0.0625 inches to 1 inch thick. Thicker sheets (0.5 inches to 1 inch thick) may be used for units 100 which will see deployment in areas where more protection may be needed. In embodiments without openings in a sidewall assembly, wall studs 37 replace bottom jack studs 43 and top jack studs 44, and interior and exterior sidewalls 61 and 62 have neither punchouts nor cutouts for insertion of window frame assembly 50. In certain embodiments of unit 100, one sidewall assembly 60 may have one or more window frame assemblies 50 while another sidewall assembly does not have any window frame assemblies 50.

Figure 47:
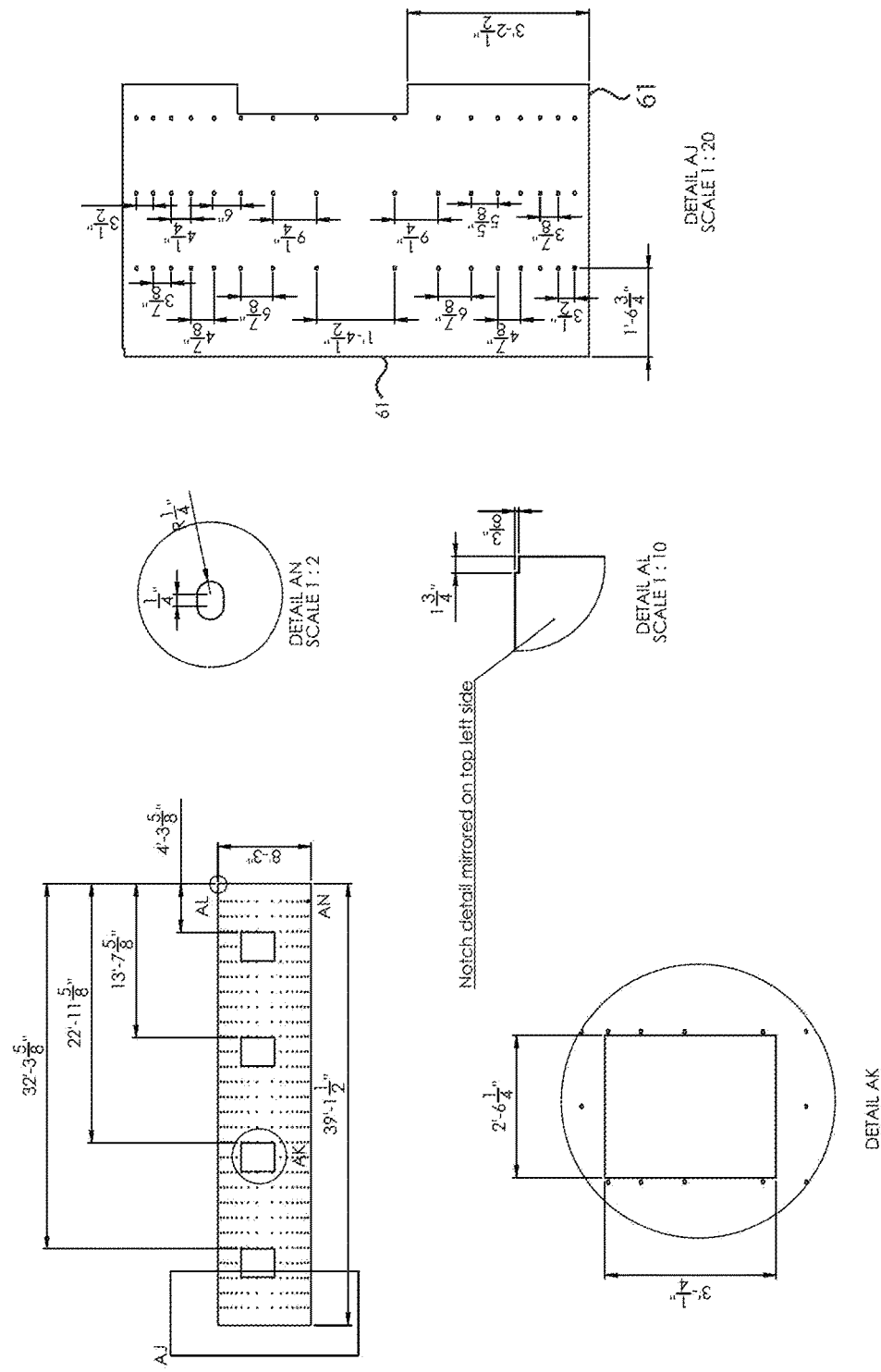
Figure 49:
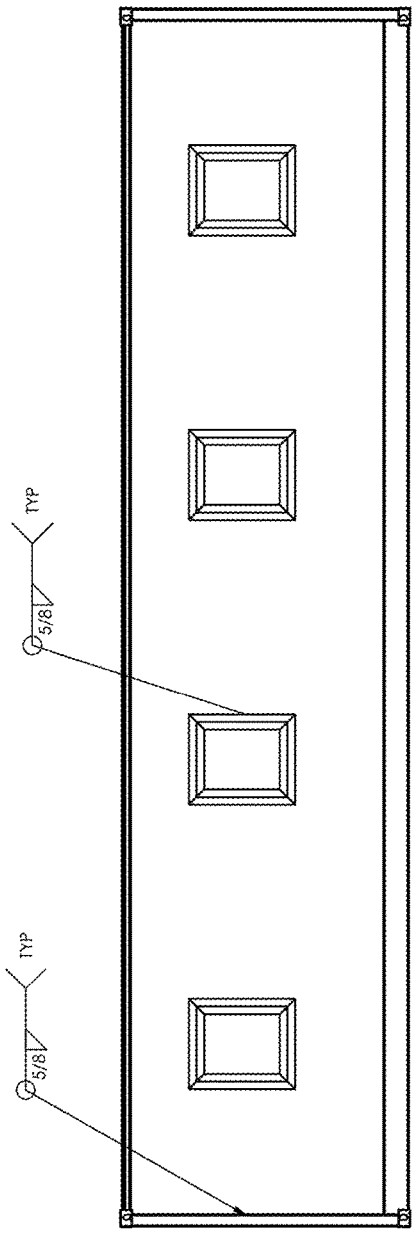

FIG. 47 illustrates interior sidewall 61, which has dimensions of 39.125 feet by 8.25 feet. FIG. 48 illustrates exterior sidewall, which has dimensions of 39.125 feet by 8.25 feet. FIG. 49 illustrates sidewall assembly 60 with windows welds.

FIGS. 50 and 51 illustrate footer 70 components of an exemplary embodiment of anti-ballistic shelter unit 100.

Unit 100 includes at least one floater 70 embedded in the ground below unit 100. Footer 70 is a concrete platform 71 having at least one metal protrusion 72 extending therefrom. Footer 70 extends below first or second end wall assembly 30 or 40 from one ISO freight container corner fitting 31 or 32 to another ISO freight container corner fitting 31 or 32. This enables connection of metal protrusion 72 to ISO freight container corner fitting 31 or 32. Certain embodiments use multiple footers 71 below a unit 100, or use a single footer 71 with multiple metal protrusions 72 beneath unit 100.

In certain embodiments, footer 70 has a rectangular or trapezoidal cross-section. In certain embodiments, metal protrusion 72 is a cone-shaped steel protrusion extending through an aperture in ISO freight container corner fitting 31 or 32. In other embodiments, metal protrusion 72 is a vertical twistlock 80 extending through an aperture in ISO freight container corner fitting 31 or 32.

Figure 52A:
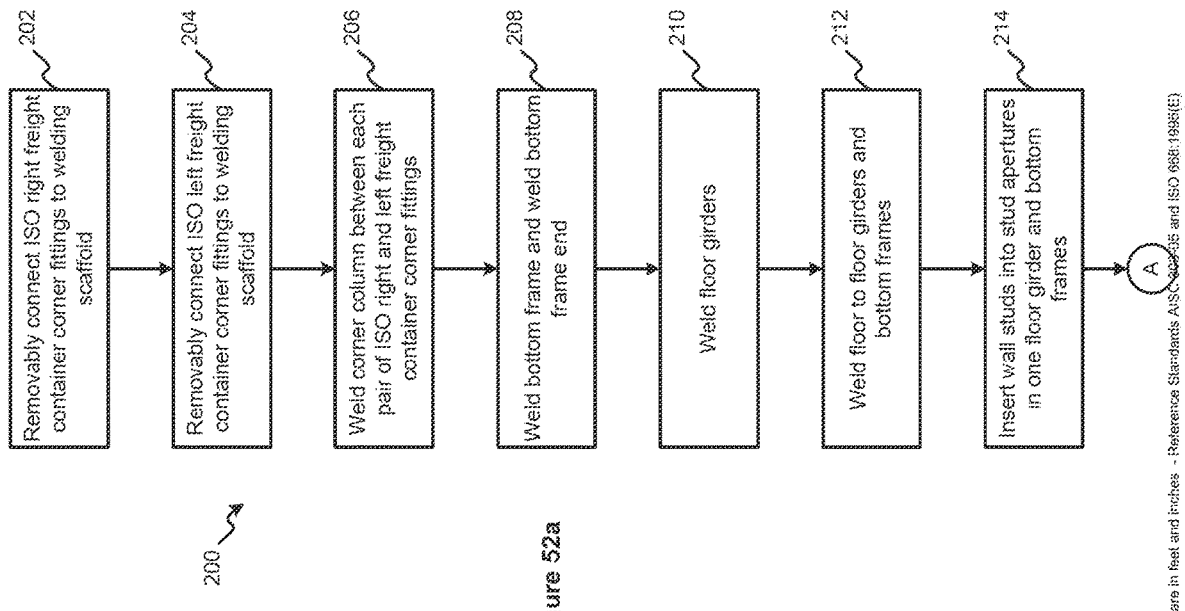
FIG. 52a through 52c illustrate a flowchart of an exemplary method for making the anti-ballistic shelter system.
Figure 52B:
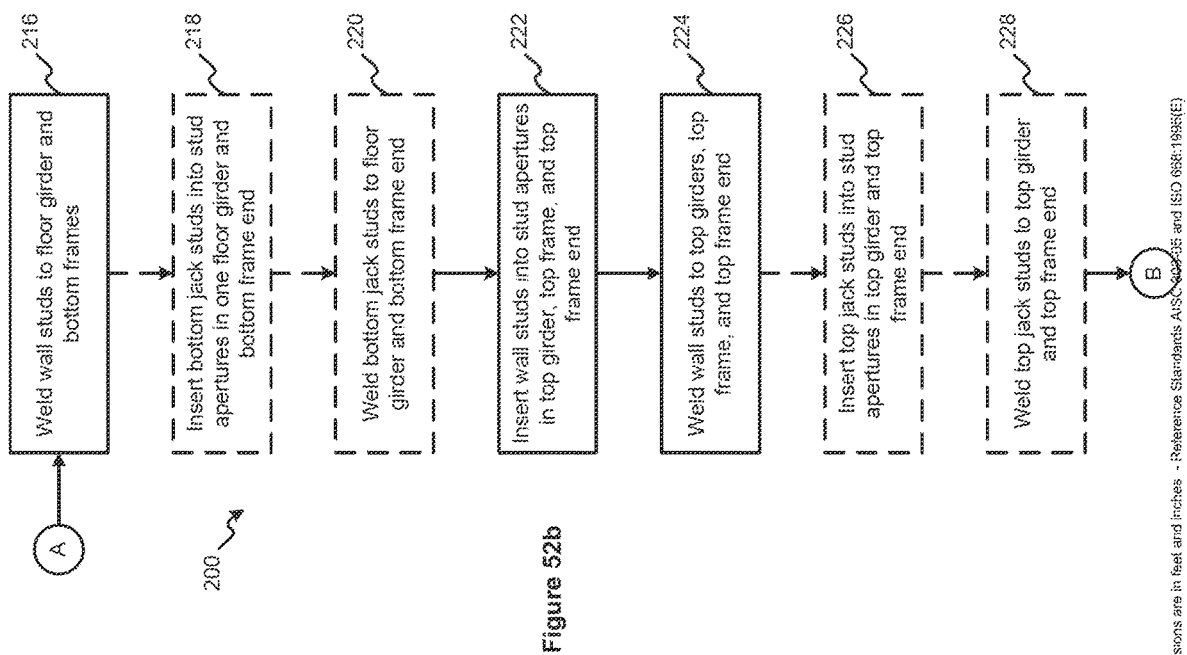
Figure 52C:
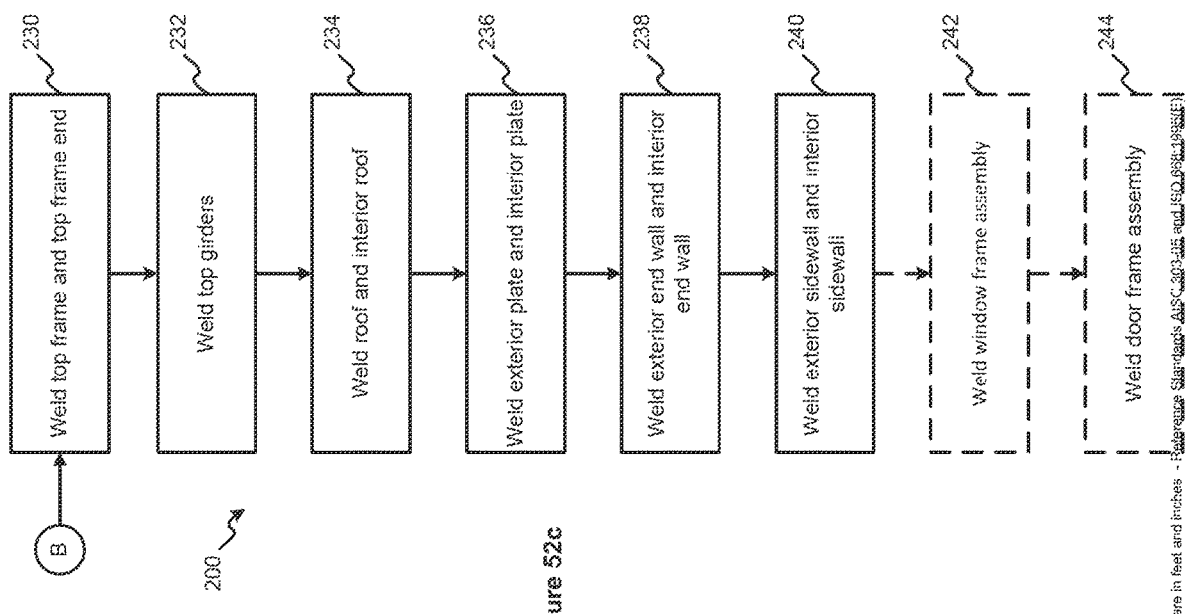

FIG. 52a through 52c illustrate a flowchart of an exemplary method for making the anti-ballistic shelter system.

In step 202, method 200 removably connects 4 ISO right freight container corner fittings 31 to a welding scaffold.

In step 204, method 200 removably connects 4 ISO left freight container corner fittings 32 to the welding scaffold. Each ISO left freight container corner fitting 32 is located directly opposite a corresponding ISO right freight container corner fitting 31.

In step 206, method 200 welds a corner column 35 between each pair of ISO right freight container corner fittings 31 and each pair of ISO left freight container corner fittings 32.

In step 208, method 200 weld bottom frame 34 between an ISO left freight container corner fitting 32 and a corresponding ISO right freight container corner fitting 31, and welds bottom frame end 41 between another ISO left freight container corner fitting 32 and another corresponding ISO right freight container corner fitting 31. Bottom frame end 41 is parallel to bottom frame for middle door 34.

In step 210, method 200 welds one floor girder 11 between an ISO left freight container corner fitting 32 and a corresponding ISO right freight container corner fitting 31, and welds another floor girder 11 between another ISO left freight container corner fitting 32 and another corresponding ISO right freight container corner fitting 31. Floor girders 11 are parallel to each other, and perpendicular to bottom frames 34 and 41.

In step 212, method 200 welds floor 14 to floor girders 11 and bottom frames 34 and 41.

In step 214, method 200 inserts wall studs 37 into stud apertures 15 in one floor girder 11 and bottom frames 34 and 41.

In step 216, method 200 welds wall studs 37 to one floor girder 11 and bottom frames 34 and 41.

In optional step 218, method 200 inserts bottom jack studs 43 into stud apertures 15 in one floor girder 11 and bottom frame end 41.

In optional step 220, method 200 welds bottom jack studs 43 to one floor girder 11 and bottom frame end 41.

In step 222 method 200 inserts the wall studs 37 of step 214 into stud apertures 15 in top girder 21, top frame 36, and top frame end 42.

In step 224, method 200 welds wall studs 37 to top girder 21, top frame 36, and top frame end 42.

In optional step 226, method 200 inserts top jack studs 44 into stud apertures 15 in top girder 21 and top frame end 42.

In optional step 228 method 200 welds top jack studs 44 to top girder 21 and top frame end 42.

In step 230 method 200 welds top frame 36 between an ISO left freight container corner fitting 32 and a corresponding ISO right freight container corner fitting 31, and welds top frame end 42 between another ISO left freight container corner fitting 32 and another corresponding ISO right freight container corner fitting 31. Top frame end 42 is parallel to top frame for middle door 36.

In step 232, method 200 welds top girder 21 between an ISO left freight container corner fitting 32 and a corresponding ISO right freight container corner fitting 31, and welds another top girder 21 between another ISO left freight container corner fitting 32 arid another corresponding ISO right freight container corner fitting 31. Top girders 21 are parallel to each other, and perpendicular to top frames 36 and 42.

In step 234, method 200 welds roof 23 and interior roof 24 to the floor/roof support beams 12, channeled floor/roof support beams 13, and top girders 21 of top assembly 20.

In step 236, method 200 welds exterior plate 38 and interior plate 39 to bottom frame 34, corner columns 35, and top frame for middle door 36 of end wall assembly with door 30.

In step 238, method 200 welds exterior end wall 45 and interior end wall 46 to bottom frame end 41, corner columns 35, and top frame end 42 of end wall assembly with window 40.

In step 240, method 200 welds exterior sidewalls 62 and interior sidewalls 61 to floor girders 11, top girders 21, and corner columns 35.

In optional step 242, method 200 welds window frame assembly 50 into endwall assembly 40 or sidewall assembly 60.

In optional step 244 method 200 welds door frame assembly 33 into endwall assembly 30 or sidewall assembly 60.

When fabricated, unit 100 conforms to ISO standards for shipping containers, having outer dimensions of 40 feet long, 8 feet wide, and 8.5 feet tall, and a maximum weight of 66.139 lbs. Unit 100 also meets the U.S. Department of State Certification Standard for Forced Entry and Ballistic Resistance of Structural Systems, SDSTD01.01

It will be understood that many additional changes in the details, materials, procedures and arrangement of parts, which have been herein described and illustrated to explain the nature of the invention, may be made by those skilled in the art within the principle and scope of the invention as expressed in the appended claims. Moreover, the term "approximate" as used herein may be applied to modify any quantitative representation that could permissibly vary without resulting in a change in the basic function to which it is related.

It should be further understood that the drawings are not necessarily to scale; instead, emphasis has been placed upon illustrating the principles of the invention.

What is claimed is:

1. A blast, ballistic and forced entry resistant shelter apparatus, wherein said apparatus comprises:
    a base assembly comprising:
        a plurality of channeled floor/roof support beams extending between a plurality of floor girders, said plurality of channeled floor/roof support beams connected to a plurality of floor/roof support beams,
        a floor connected to said plurality of floor girders,
        wherein one of said plurality of floor girders has a plurality of stud apertures spaced 16 inches apart at center,
        wherein each of said plurality of channeled floor/roof support beams has a length of 9.59375 feet, a width of 3 inches, a height of 2 inches, and a weight of 7.1 lbs. per foot of length,
        wherein each of said plurality of floor girders has a length of 39.125 feet and a hollow structural cross-section of 10 by 5 by ⅜ inches
        wherein each of said plurality of floor/roof support beams has a length of 7.125 feet and a hollow structural cross-section of 3 by 3 by ⁵⁄₁₆ inches,
        wherein said floor has dimensions of 39.5 feet by 7.395833 feet;
    a top assembly comprising:
        a plurality of channeled floor/roof support beams extending between a plurality of top girders, said plurality of channeled floor/roof support beams connected to a plurality of floor/roof support beams,
a roof connected to and located above said plurality of top girders,
an interior roof connected to and located below said plurality of top girders,
wherein said plurality of top girders have a plurality of stud apertures spaced 16 inches apart at center,
wherein each of said plurality of top girders has a length of 39.833 feet and a hollow structural cross-section of 5 by 3 by ½ inches,
wherein said roof has dimensions of 39.95833 feet by 7.95833 feet,
wherein said interior roof has dimensions of 39.20833 feet by 7.125 feet;
a first end wall assembly comprising:
two ISO right freight container corner fittings and two ISO left freight container corner fittings, a bottom frame and a top frame connecting said two ISO right freight container corner fittings to said two ISO left freight container corner fittings,
a plurality of corner columns connecting said two ISO right freight container corner fittings and connecting said two ISO left freight container corner fittings,
an exterior plate connected to said bottom frame, said top frame, and said plurality of corner columns,
an interior plate connected to said bottom frame, said top frame, and said plurality of corner columns,
wherein said bottom frame and said top frame have a plurality of stud apertures, wherein a plurality of wall studs extend through said plurality of stud apertures into said bottom frame and said top frame,
wherein said bottom frame has a length of 6.9270833 feet and a hollow structural cross-section of 10 by 5 by ⅜ inches,
wherein said top frame has a length of 6.9270833 feet and a hollow structural cross-section of 5 by 3 by ⅜ inches,
wherein each of said plurality of corner columns has a height of 9.166 feet, and a hollow structural cross-section of 5 by 5 by ⅜ inches,
wherein each of said plurality of wall studs has a height of 9.166 feet and a hollow structural cross-section of 3 by 2 by ¼ inches,
wherein said exterior plate has dimensions of 7.125 feet by 8.270833 feet,
wherein said interior plate has dimensions of 7.125 feet by 8.270833 feet;
a second end wall assembly comprising:
two ISO right freight container corner fittings and two ISO left freight container corner fittings, a bottom frame end and a top frame end connecting said two ISO right freight container corner fittings to said two ISO left freight container corner fittings,
a plurality of corner columns connecting said two ISO right freight container corner fittings and connecting said two ISO left freight container corner fittings,
an exterior end wall connected to said bottom frame end, said top frame end, and said plurality of corner columns,
an interior end wall connected to said bottom frame end, said top frame end, and said plurality of corner columns,
wherein said bottom frame end and said top frame end have a plurality of stud apertures,
wherein a plurality of wall studs extend through said plurality of stud apertures into said bottom frame end and said top frame end,
wherein said bottom frame end has a length of 7.125 feet and a hollow structural cross-section of 10 by 5 by ⅜ inches,
wherein said top frame end has a length of 6.9270833 feet and a hollow structural cross-section of 5 by 3 by ½ inches,
wherein said exterior end wall has dimensions of 7.125 feet by 8.270833 feet,
wherein said interior end wall has dimensions of 7.125 feet by 8.25 feet; and
a plurality of sidewall assemblies, each sidewall assembly comprising:
an exterior sidewall connected to one of said plurality of floor girders and said top girder,
an interior sidewall connected to one of said plurality of floor girders and said top girder,
wherein a plurality of wall studs extend into said top girder and one of said plurality of floor girders through said plurality of stud apertures in said top girder and one of said plurality of floor girders,
wherein said exterior sidewall has dimensions of 39.125 feet by 8.25 feet,
wherein said interior sidewall has dimensions of 39.125 feet by 8.25 feet.

2. The apparatus of claim 1, wherein a center of each stud aperture is located 12.25 inches to 16 inches from a center of another stud aperture in a top end beam or a bottom end beam.

3. The apparatus of claim 1, wherein at least one pair of said exterior end wall and said interior end wall or said interior sidewall and said exterior sidewall includes at least one window frame assembly.

4. The apparatus of claim 3, wherein said at least one window frame assembly comprises a plurality of horizontal window frames, a plurality of vertical window frames, a plurality of vertical window moldings, and a plurality of horizontal window moldings.

5. The apparatus of claim 1, wherein said exterior end plate and said interior end plate include a door frame assembly.

6. The apparatus of claim 5, wherein said door frame assembly has dimensions of 7.25 feet by 3.84375 feet.

7. The apparatus of claim 5, wherein said door frame assembly includes two vertical door frames connected by a door header.

8. The apparatus of claim 1, wherein said exterior plate, said interior plate, said exterior end wall, said interior end wall, said interior sidewall, and said exterior sidewall are 0.0625 inches to 0.5 inches thick.

9. The apparatus of claim 1, wherein said exterior plate, said interior plate, said exterior end wall, said interior end wall, said interior sidewall, and said exterior sidewall are 0.5 inches to 1 inch thick.

10. The apparatus of claim 1, further comprising at least one footer embedded in the ground, wherein said footer comprises a concrete platform having at least one metal protrusion extending therefrom.

11. The apparatus of claim 10, wherein said at least one footer has a trapezoidal cross-section.

12. The apparatus of claim 10, wherein said at least one footer extends from one of said ISO right freight container corner fittings to one of said ISO left freight container corner fittings.

13. The apparatus of claim 10, wherein said at least one metal protrusion is a vertical twistlock removably connected to one of said ISO right freight container corner fittings or one of said ISO left freight container corner fittings.

14. The apparatus of claim 10, wherein said at least one footer comprises a first footer and a second footer, wherein said first footer extends below said first end wall assembly and said second footer extends below said second end wall assembly.

15. The apparatus of claim 10, wherein said at least one metal protrusion is a cone-shaped steel protrusion extending through an aperture in one of said ISO right freight container corner fittings or one of said ISO left freight container corner fittings.

* * * * *